(12) United States Patent  
Ishizuka et al.

(10) Patent No.: US 7,284,538 B2  
(45) Date of Patent: Oct. 23, 2007

(54) ROTATION ANGLE SENSING DEVICE

(75) Inventors: Koji Ishizuka, Chita-gun (JP); Kenichiro Nakata, Kariya (JP)

(73) Assignee: DENSO Corporation, Kariya, Aichi-pref. (JP)

( * ) Notice: Subject to any disclaimer, the term of this patent is extended or adjusted under 35 U.S.C. 154(b) by 0 days.

(21) Appl. No.: 11/508,280

(22) Filed: Aug. 23, 2006

(65) Prior Publication Data

US 2007/0044548 A1  Mar. 1, 2007

(30) Foreign Application Priority Data

Aug. 23, 2005  (JP) ............................. 2005-240655  
Jan. 11, 2006  (JP) ............................. 2006-003853

(51) Int. Cl.  
 *F02D 31/00* (2006.01)  
 *F02D 41/30* (2006.01)

(52) U.S. Cl. ...................................... 123/481; 123/436

(58) Field of Classification Search ................ 123/481, 123/198 DB, 436, 476, 480, 486, 487, 406.58, 123/406.61, 406.62; 701/103–106, 112, 701/115

See application file for complete search history.

(56) References Cited

U.S. PATENT DOCUMENTS 5,428,991 A   7/1995  Klenk et al.

5,864,775 A *  1/1999  Bradshaw et al. .......... 702/104  
6,014,599 A    1/2000  Inoue et al.

FOREIGN PATENT DOCUMENTS

JP   10-122031   5/1999  
JP   11-247707   9/1999

* cited by examiner

*Primary Examiner*—Hai Huynh  
(74) *Attorney, Agent, or Firm*—Nixon & Vanderhye P.C.

(57) ABSTRACT

A rotation angle sensing device calculates an average value of calculation values of time necessary for rotation of each one of sections provided by equally dividing one rotation of a crankshaft. The device calculates an average value of the average values of the entire sections to calculate an entire section average value. The device calculates ratios of the average values of the respective sections to the entire section average value. The device eliminates an influence of rotation fluctuation of the crankshaft from the ratios by using reference ratios, which are calculated as ratios of the average values of the respective sections to the entire section average value in the case where there is no structural error. Thus, the device calculates learning values for compensating for the structural error.

15 Claims, 14 Drawing Sheets

ROTATION ANGLE SENSING DEVICE

CROSS REFERENCE TO RELATED APPLICATION

This application is based on and incorporates herein by reference Japanese Patent Application No. 2005-240655 filed on Aug. 23, 2005 and Japanese Patent Application No. 2006-3853 filed on Jan. 11, 2006.

BACKGROUND OF THE INVENTION

1. Field of the Invention

The present invention relates to a rotation angle sensing device for taking in an output of a crank angle sensor, which senses multiple sensed portions rotating in synchronization with rotation of a crankshaft of an internal combustion engine, to sense a rotation angle of the crankshaft.

2. Description of Related Art

A known rotation angle sensing device of this type senses a rotation angle of an output shaft (crankshaft) by sensing multiple teeth (sensed portions) formed on a rotor, which is provided on the crankshaft, at an equal interval based on an output of a crank angle sensor. Usually, the intervals among the actual teeth have a structural error. The structural error can cause an error in sensing of the rotation angle of the crankshaft.

Therefore, for example, a device described in JP-A-H11-247707 senses time necessary for rotation of a section defined by two teeth and compares the sensed time with theoretical time to sense an angle error between the two teeth. One rotation range of the crankshaft is divided into multiple sections in accordance with the teeth, and the theoretical time is defined for each one of the divided sections. With this device, even if the rotation speed of the crankshaft cyclically changes in a cycle of 360° CA, influence of the cyclic change can be eliminated when the angle error is sensed.

However, the actual rotation speed of the crankshaft does not necessarily change cyclically in the cycle of 360° CA. Therefore, a difference between the sensed time and the theoretical time contains an influence of rotation fluctuation of the crankshaft that does not have the cycle of 360° CA. The angle error sensed by this device contains the influence of the rotation fluctuation of the crankshaft that does not have the cycle of 360° CA. As a result, it is difficult to sense the angle error at high accuracy. Moreover, this device has to prepare the theoretical time for sensing the angle error, complicating the manufacturing process of the device.

Another rotation angle sensing device is described also in JP-A-H10-122031 or JP-A-H10-73613.

SUMMARY OF THE INVENTION

It is an object of the present invention to provide a rotation angle sensing device capable of accurately sensing an angle error of a crankshaft due to a structure of sensed portions rotating in synchronization with rotation of the crankshaft.

It is another object of the present invention to provide a rotation angle sensing device capable of accurately calculating an angle error while inhibiting complication of a manufacturing process.

According to an aspect of the present invention, a rotation angle sensing device has a fuel cutting control device, a calculation device, an averaging device and an error sensing device. The fuel cutting control device performs fuel cutting control for stopping fuel injection generating torque of a crankshaft. The calculation device divides entire sections defined by one or more rotations of the crankshaft into multiple sections by using the sensed portions and calculates time necessary for rotation of each one of the multiple sections based on the output of the crank angle sensor obtained during the fuel cutting control. The averaging device calculates an average value of multiple calculation values of the calculation device for each section. The error sensing device senses an angle error of an arbitrary section out of the multiple sections based on comparison between the average value of the arbitrary section and the average value of another section or comparison between the average value of the arbitrary section and an average value of the average values of two or more sections out of the multiple sections.

With this structure, while the crankshaft rotates through a crank angle corresponding to an integral multiple of the entire sections, the integral multiple of the calculation values of the time necessary for the rotation of each one of the multiple sections are calculated. The averaging device calculates the average value of the calculation values for each one of the multiple sections. The structural angle error of the arbitrary section in the case where the at least one section is used as the reference occurs in the form of deviation in the average value of the arbitrary section with respect to the average value of the at least one section. The angle error of the arbitrary section can be sensed by comparing the average values.

Moreover, the rotation fluctuation of the crankshaft is averaged in the respective average values. Therefore, by using the average values, the influence of the rotation fluctuation of the crankshaft due to a complicated force applied to the crankshaft or a noise or the like mixing in the output of the crank angle sensor can be suitably inhibited when the angle error is sensed.

According to another aspect of the present invention, a rotation angle sensing device has an estimating device and an error sensing device. The estimating device estimates an attenuation degree of rotation speed of the crankshaft due to fuel cutting control based on calculation values of a physical value related to rotation of a section defined by two predetermined sensed portions at a start and an end of an integral multiple of one rotation of the crankshaft. The error sensing device determines a reference value of the physical value of an arbitrary section based on an attenuation mode of the rotation speed determined based on the physical value related to the rotation of the section determined by the sensed portions and the attenuation degree. The error sensing device senses the angle error of the arbitrary section based on a deviation of a section parameter of the arbitrary section from the reference value.

With this structure, the deviation in the calculation values of the physical value related to the rotation of the section defined by the two predetermined sensed portions at the times different from each other by the integral multiple of one rotation of the crankshaft suitably represents the attenuation degree of the rotation speed of the crankshaft due to the fuel cutting control. Even in the case where the angle error in a certain section causes an error in the time necessary for the rotation of the certain section or rotation speed of the certain section, a lengthening degree of the time necessary for the rotation of the certain section or a decreasing degree of the rotation speed of the certain section after the integral multiple of one rotation of the crankshaft suitably represents the attenuation degree of the rotation speed of the crankshaft. The attenuation mode of the rotation speed of the crankshaft due to the fuel cutting control cannot be grasped with only the attenuation degree. Therefore, the above-described structure grasps the attenuation mode of the rotation speed of the crankshaft based on the attenuation degree and the physical value related to the rotation of the section determined by the sensed portions. A reference value of the physical value such as the time necessary for the rotation of an arbitrary section or rotation speed of the arbitrary section can be determined based on the attenuation mode. Thus-determined physical value can be used as a physical value as a reference in the case where there is no angle error in the arbitrary section. The angle error can be sensed based on a deviation between the physical value and the section parameter.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Figure 1:
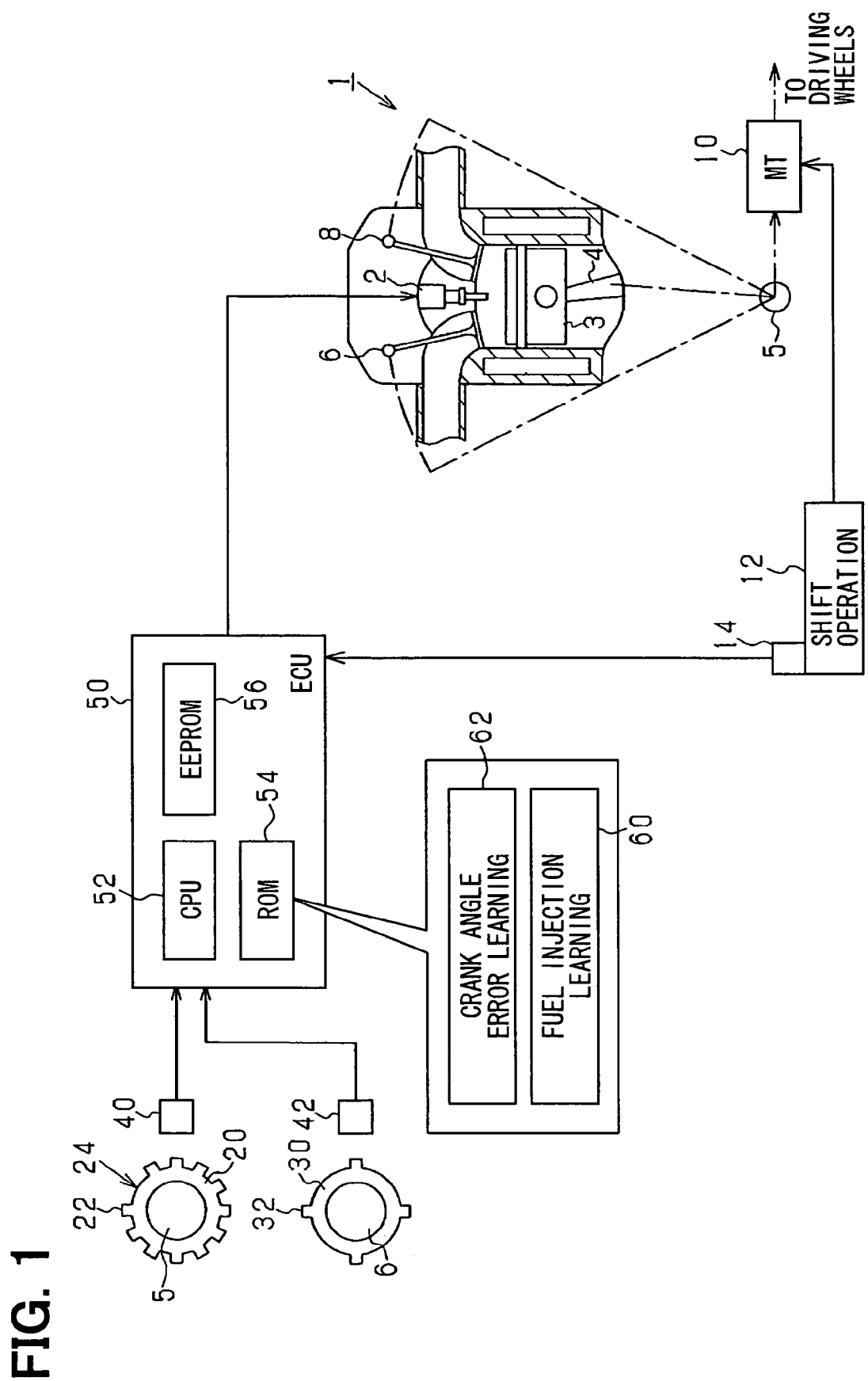
FIG. 1 is a schematic diagram showing an engine system according to a first example embodiment of the present invention.

Referring to FIG. 1, a rotation angle sensing device according to a first example embodiment of the present invention applied to a rotation angle sensing device of a diesel engine mounted on a manual transmission vehicle is illustrated. The diesel engine 1 shown in FIG. 1 is a multi-cylinder (four-cylinder, in the present embodiment) internal combustion engine. Actuators such as fuel injection valves 2 are provided in respective cylinders. Pistons 3 of the respective cylinders are connected with a crankshaft 5 through connecting rods 4. The crankshaft 5 is mechanically connected with camshafts 6, 8. Each of the camshafts 6, 8 rotates once while the crankshaft 5 rotates twice. The diesel engine 1 is a four-stroke engine. The crankshaft 5 can be linked with driving wheels through a manual transmission (MT) 10. Operation of a shift position of a shift operation section 12 is performed by a user. The shift position of the MT 10 is changed through the operation of the shift operation section 12. The shift operation section 12 is provided with a shift position sensor 14 for sensing the shift operation position.

The crankshaft 5 is provided with a rotor 20 as shown in an enlarged scale in FIG. 1. The rotor 20 is formed with multiple sensed portions (teeth) 22. Basically, the teeth 22 are formed on the rotor 20 at an equal interval (for example, 30° CA in the present embodiment). A tooth-missing portion 24 is provided at a point of the rotor 20. The camshaft 6 is provided with a rotor 30. The rotor 30 is formed with multiple sensed portions (teeth) 32. Four teeth 32 are formed at an equal interval on the rotor 30 in this example. A crank angle sensor 40 senses the teeth 22. A cam angle sensor 42 senses the teeth 32.

An electronic control unit (ECU) 50 has a central processing unit (CPU) 52, a read only memory (ROM) 54, an electrically erasable and programmable read only memory (EEPROM) 56 and the like. The ECU 50 reads in sensing values about various types of operation states of the diesel engine 1 sensed by sensors such as the crank angle sensor 40 and the cam angle sensor 42 and sensing values about requirements of the user sensed by sensors such as the shift position sensor 14. The ECU 50 operates the various types of actuators such as the fuel injection valves 2 based on the sensing results to control an output of the diesel engine 1.

The ROM 54 stores various types of programs to perform the output control properly. The programs include a fuel injection learning program 60 for calculating a learning value for compensating for a variation among injection characteristics of the fuel injection valves 2 of the cylinders and a crank angle error learning program 62 for compensating for a structural error of the intervals among the teeth 22, for example.

The fuel injection learning program 60 calculates the learning value as follows. Operation amounts of the fuel injection valves 2 of the respective cylinders are set to reduce differences among increases of rotation speed of the crankshaft 5 accompanying the fuel injections in the respective cylinders to zero. Differences between a reference operation amount and the operation amounts obtained in the above process are employed as the learning values of the respective cylinders.

The thus-calculated learning values are used to substantially equalize the increases of the rotation speed calculated based on the output of the crank angle sensor 40. However, in the case where there is a structural error in the intervals of the teeth 22, the rotation angle or the rotation speed calculated based on the output of the crank angle sensor 40 deviates from the actual rotation angle or the actual rotation speed. When the deviation is generated, the variation among the injection characteristics of the fuel injection valves 2 of the cylinders cannot be compensated for by the learning values obtained through the above-described process.

Therefore, in the present embodiment, learning values for compensating for the structural error of the intervals of the teeth 22 are calculated with the use of the crank angle error learning program 62.

Figure 2A:
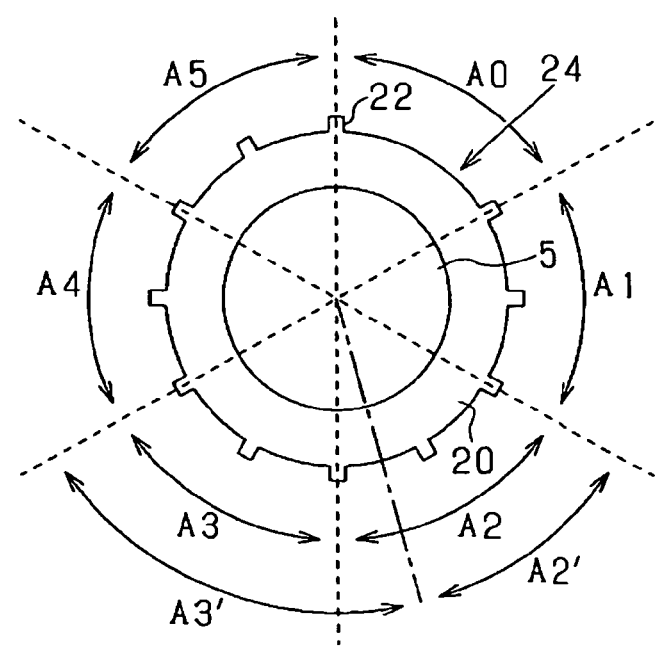
FIG. 2A is a diagram showing a rotor provided on a crankshaft according to the FIG. 1 embodiment.

As shown in FIG. 2A, a section defined by two teeth 22 on both sides of the tooth-missing portion 24 on the rotor 20 provided on the crankshaft 5 is named as a section A0. Sections A1-A5 are defined in a clockwise direction from the section A0 at an interval of 60° CA. In the example of the sections A0-A5 shown in FIG. 2A, no deviation is caused among the teeth 22. Therefore, the sections A0-A5 are equal to each other. In an example defined by sections A2', A3', a deviation is caused in the teeth 22 in the sections A2', A3'. Accordingly, the sections A2', A3' deviate from the sections A2, A3.

Figure 2B:
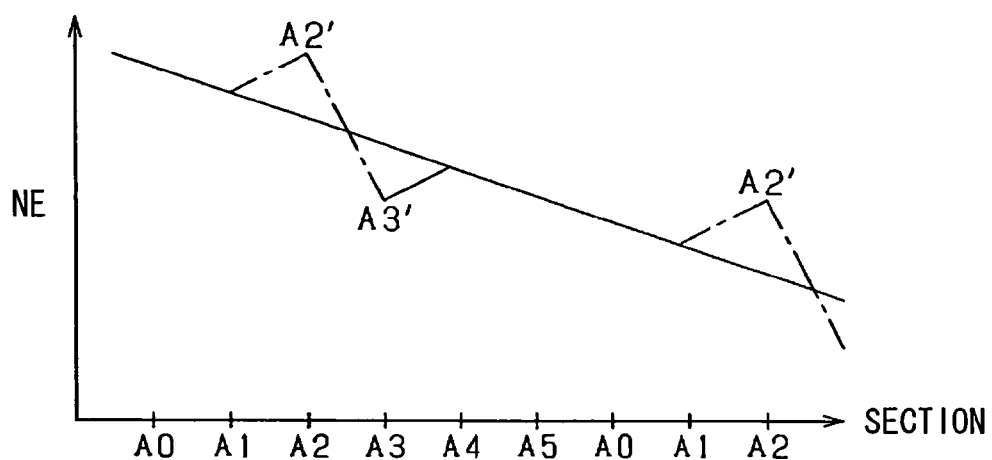
FIG. 2B is a graph showing rotation speed of the crankshaft according to the FIG. 1 embodiment.
Figure 2C:
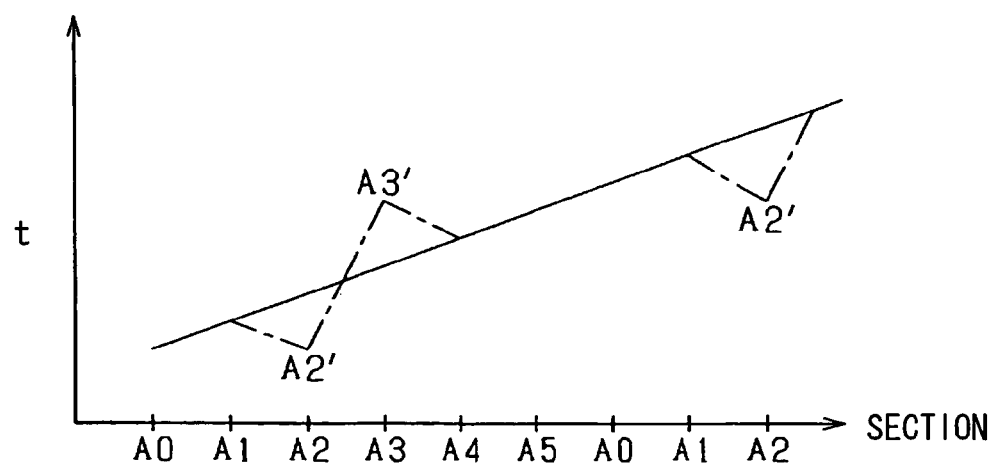
FIG. 2C is a graph showing time necessary for rotation of the crankshaft according to the FIG. 1 embodiment.

FIG. 2B illustrates rotation speed NE sensed in the sections A0-A5 during fuel cutting control for stopping the fuel injection contributing to generation of torque of the crankshaft 5 of the diesel engine 1. FIG. 2C illustrates time (elapsed time) t necessary for the rotation of the sections A1-A5 during the fuel cutting control. In the example shown by solid lines in FIGS. 2B and 2C, there is no structural deviation among the teeth 22. As shown in FIGS. 2B and 2C, due to the fuel cutting control, the rotation speed NE gradually decreases and the elapsed time t gradually lengthens. Rotation speed NE sensed when the structural deviation is caused in the intervals of the teeth 22 is shown by a chained line in FIG. 2B. As shown by the chained line in FIG. 2B, the rotation speed NE increases once in the section A2' and becomes smaller than the actual value in the section A3'. The elapsed time t sensed when the structural deviation is caused in the intervals of the teeth 22 is shown by a chained line in FIG. 2C. As shown by the chained line in FIG. 2C, the elapsed time t decreases once in the section A2' and becomes larger than the actual value in the section A3'.

Learning values for compensating for the angle error should be preferably learned to compensate for the structural angle error in the intervals of the teeth 22. Accurate learning of the learning values can be hindered by the fluctuation in the actual rotation of the crankshaft 5 due to a force applied to the crankshaft 5 or mixing of a noise in the output of the crank angle sensor 40.

Figure 3:
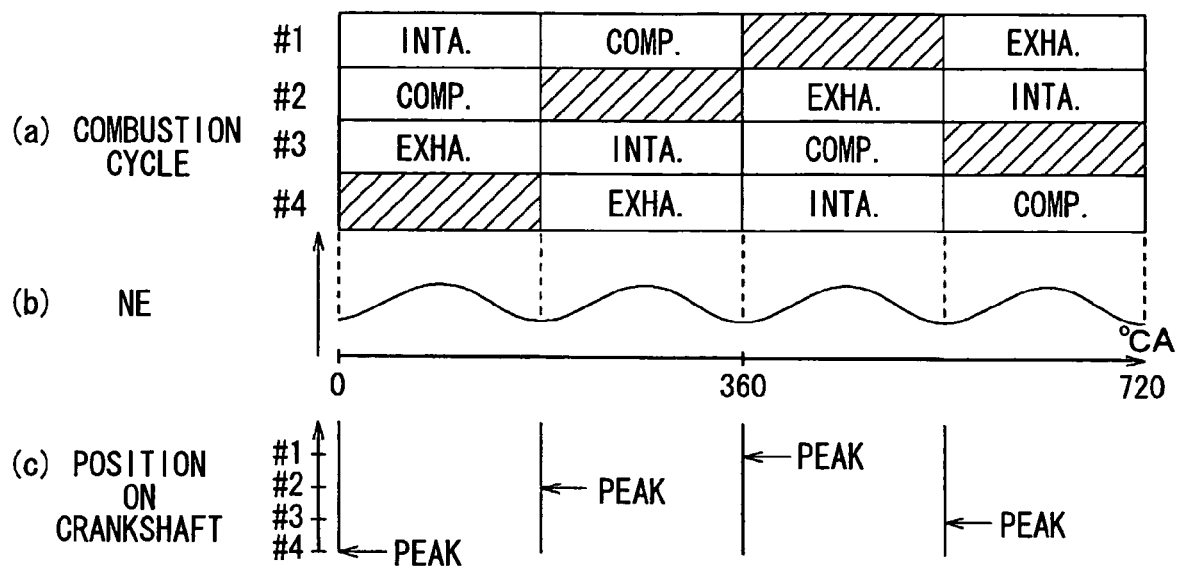
FIG. 3 is a diagram showing rotation fluctuation of the crankshaft during fuel cutting control according to the FIG. 1 embodiment.

A part (a) of FIG. 3 shows combustion cycles of the respective cylinders #1, #2, #3, #4 and a part (b) of FIG. 3 shows fluctuation of the rotation speed NE of the crankshaft 5 during the fuel cutting control. The combustion cycle of each cylinder includes an intake stroke, a compression stroke and an exhaustion stroke. Since the fuel cutting control is performed, combustion strokes are not shown in the part (a) of FIG. 3. Decrease of the rotation speed NE due to the fuel cutting control is ignored for the sake of simplicity in FIG. 3.

As shown in FIG. 3, the rotation speed NE is minimized cyclically near compression top dead centers of the respective cylinders. However, this does not mean that a cyclic force having a cycle of timing of the compression top dead center is applied to the crankshaft 5. For example, the second cylinder #2 is at its compression top dead center at 180° CA as shown in the part (a) of FIG. 3. At that time, the force of the piston 3 of the second cylinder #2 for restraining the rotation of the crankshaft 5 through the connecting rod 4 becomes specifically strong (reaches a peak) as shown in a part (c) of FIG. 3. The first cylinder #1 is at its compression top dead center at 360° CA as shown in the part (a) of FIG. 3. At that time, the force of the piston 3 of the first cylinder #1 for restraining the rotation of the crankshaft 5 through the connecting rod 4 becomes specifically strong (reaches a peak) as shown in the part (c) of FIG. 3. As shown in the part (c) of FIG. 3, peak positions where the force is applied to the crankshaft 5 at the compression top dead centers of the respective cylinders #1-#4 differ from each other on the crankshaft 5. It is because the connecting rods 4 connected with the respective pistons 3 are connected to the crankshaft 5 at positions different from each other.

Accordingly, the force of the crankshaft 5 for continuing the rotation by inertia after the fuel cutting control and the force of the pistons 3 of the respective cylinders for restraining the crankshaft 5 through the connecting rods 4 cause a twisting force in the crankshaft 5 in a cycle of 720° CA.

Figure 4:
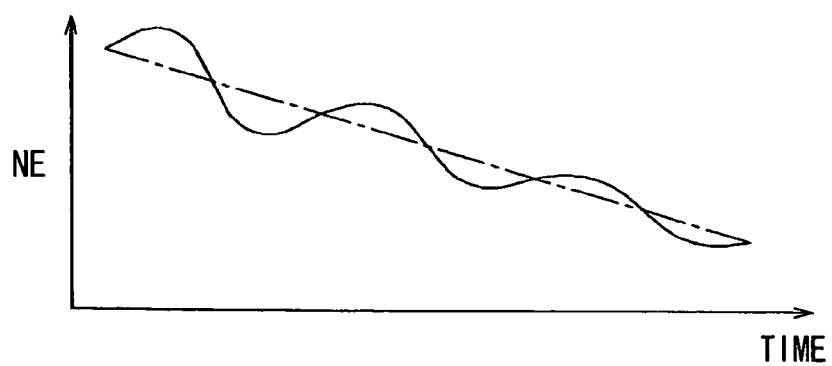
FIG. 4 is a time chart showing the rotation fluctuation of the crankshaft during the fuel cutting control according to the FIG. 1 embodiment.

To be more exact, the rotation fluctuation is attenuated in accordance with the decrease of the rotation speed NE of the crankshaft 5 as shown by a solid line in FIG. 4. The twisting force is also attenuated. For example, the twisting force caused at 180° CA by the restraining force of the piston 3 of the second cylinder #2 applied to the crankshaft 5 through the connecting rod 4 and the inertia of the crankshaft 5 can cause a reversed twisting force applied to the crankshaft 5 afterwards due to resilience of the crankshaft 5 and the like.

Thus, the force applied to the crankshaft 5 during the fuel cutting control fluctuates in a complicated manner. Accordingly, the rotation speed NE of the crankshaft 5 also fluctuates in a complicated manner. In the present embodiment, average values of the times necessary for the rotation of the sections A0-A5 are used to minimize the influence of the fluctuation and the influence of the noise mixing in the output of the crank angle sensor 40 when the structural error of the intervals of the teeth 22 is sensed.

Figure 5A:
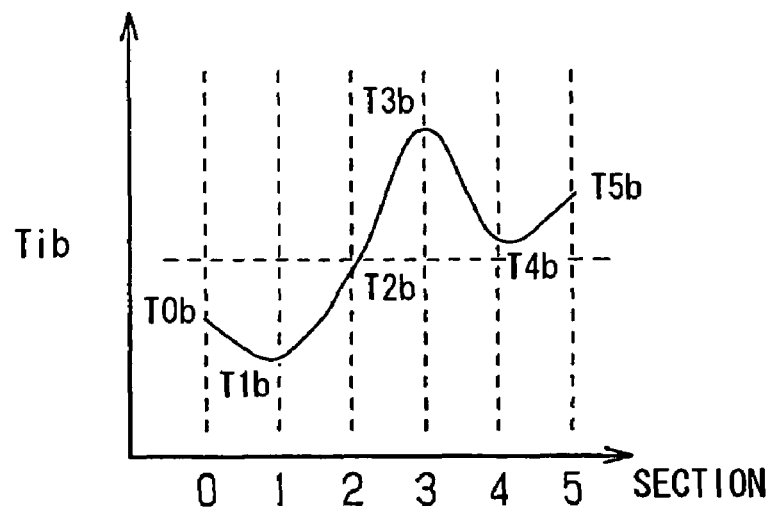
FIG. 5A is a graph showing an average value of the time of the rotation of the crankshaft according to the FIG. 1 embodiment.

First, calculation values $Ti\_j$ (i=0 to 5, j=1 to n) of the time necessary for the rotation of the sections Ai are calculated. The suffix j represents a sampling number. Adjacent sampling numbers j indicate the samplings at adjacent timing. Average values Tib of the calculation values $Ti\_j$ of the sections Ai are calculated respectively as shown in FIG. 5A and following Expression 1.

$$T0b=(T0\_1+T0\_2+T0\_3+\ldots+T0\_n)/n,$$

$$T1b=(T1\_1+T1\_2+T1\_3+\ldots+T1\_n)/n,$$

$$\vdots$$

$$T5b=(T5\_1+T5\_2+T5\_3+\ldots+T5\_n)/n \quad \text{(Expression 1)}$$

Then, an entire section average value Tba is calculated by averaging the average values Tib as shown by following Expression 2.

$$Tba=(T0b+T1b+\ldots+T5b)/6 \quad \text{(Expression 2)}$$

Figure 5B:
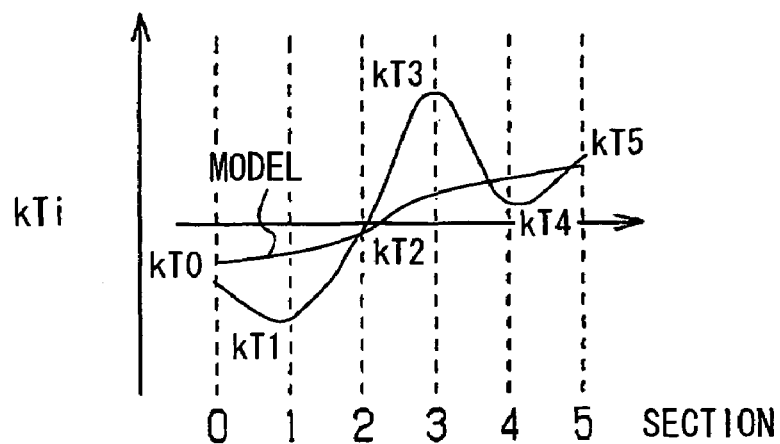
FIG. 5B is a graph showing a ratio of the average value of the time of the rotation of the crankshaft according to the FIG. 1 embodiment.

Then, ratios kTi of the average values Tib to the entire section average value Tba are calculated as shown in FIG. 5B and following Expression 3.

$$kT0=T0b/Tba,$$

$$kT1=T1b/Tba,$$

$$\vdots$$

$$kT5=T5b/Tba \quad \text{(Expression 3)}$$

Each ratio kTi well approximates the structural error of the section Ai. Each average value Tib is an average value of the multiple calculation values $Ti\_j$ of the time necessary for the rotation of each section Ai. Therefore, the influence of the rotation fluctuation such as the influence of the noise mixing in the output of the crank angle sensor 40 or the influence of the attenuation of the rotation of the crankshaft 5 is inhibited in each average value Tib. The entire section average value Tba is the average value in the rotation through n-times of 360° CA. Accordingly, the influence of the noise mixing in the output of the crank angle sensor 40, the influence of the attenuation of the rotation of the crankshaft 5, the influence of the rotation fluctuation and the like are inhibited in the entire section average value Tba. Therefore, the entire section average value Tba is a suitable reference value of the time necessary for the rotation of each one of the sections Ai. The ratio kTi quantifies the deviation with respect to the reference. The deviation is an accurate value calculated by quantifying the structural error of each section Ai.

The influences of the fluctuation of the force applied to the crankshaft 5 and the like are inhibited in the ratios kTi. However, the ratios kTi contain the influences. Therefore, in the present embodiment, the ratios kTi are corrected by using a reference model shown in FIG. 5B. The reference model shown in FIG. 5B basically determines ratios of the times necessary for the rotation of the sections Ai to a rotation time per section averaged through the entire sections when there is no structural error.

Figure 5C:
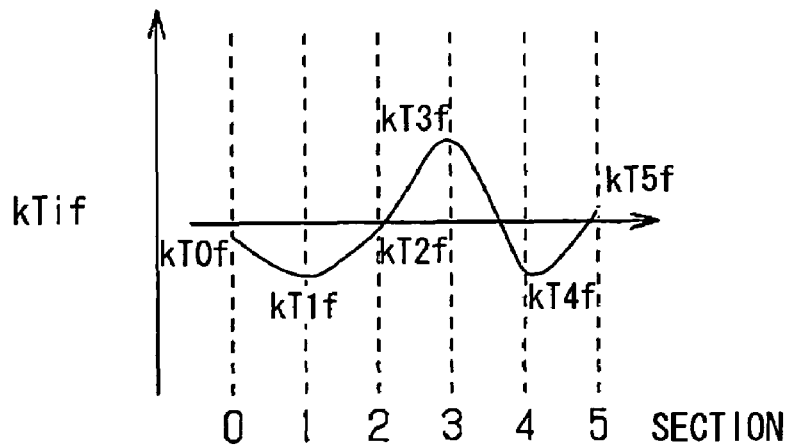
FIG. 5C is a graph showing a learning value of the time of the rotation of the crankshaft according to the FIG. 1 embodiment.

The reference model consists of reference ratios kTni corresponding to the respective sections Ai. The reference ratios kTni are set at ratios kTi of the respective average values Tib to the entire section average value Tba at the time when there is no structural error. Final learning values kTif are calculated by dividing the ratios kTi by the reference ratios kTni as shown in FIG. 5C and following Expression 4.

$$kT0f=kT0/kTn0,$$

$$kT1f=kT1/kTn1,$$

$$\vdots$$

$$kT5f=kT5/kTn5 \quad \text{(Expression 4)}$$

The structural error in the sections Ai can be compensated for by using the learning values kTif. For example, if the time Ti necessary for the rotation of the section Ai is sensed, the time Ti is corrected into true time Ti/kTif, in which the error is compensated for.

Next, processing steps of the learning control according to the present embodiment will be described in reference to FIG. 6. The processing steps are set in the crank angle error learning program 62. The processing includes flag processing and the like and is repeatedly executed by the ECU 50 (specifically, the CPU 52) in a predetermined crank angle cycle. In the series of processing, first, Step S10 determines whether the section Ai sensed by the crank angle sensor 40 is the section A0. If the answer to Step S10 is NO, the series of processing is ended once. If the answer to Step S10 is YES, the processing goes to Step S12. Step S12 determines whether a learning condition is established. The learning condition is established when all of following conditions are established: (i) the shift operation section 12 is at a neutral range; (ii) the rotation speed NE is in a predetermined range (NElow≦NE≦NEup); and (iii) the fuel cutting control is in progress.

The condition (i) is employed to perform the learning control under a condition that conforms the torque applied from the driving wheel side to the crankshaft 5 to substantially zero. By establishing the condition (i), the fluctuation of the torque applied to the crankshaft 5 caused by the torque fluctuation applied from the driving wheel side can be averted. The condition (ii) is employed to perform the learning control under a condition that prevents the fluctuation of the twisting force applied to the crankshaft 5 from increasing excessively. The upper limit value NEup is set based on a lower limit value of the rotation speed NE above which the fluctuation of the twisting force increases excessively and the rotation fluctuation of the crankshaft 5 can impose a significant influence on the learning control accuracy. The condition (iii) is employed to avert the rotation fluctuation of the crankshaft 5 due to the combustion stroke. The fuel cutting control is performed during deceleration of the vehicle, for example.

If the learning condition is established, the processing goes to Step S14. Step S14 calculates the time Ti necessary for the rotation of the section Ai. The processing of Step S14 is repeated until the crankshaft 5 rotates once (through 360° CA), i.e., until Step S16 determines that the rotation through 360° CA is made. If the crankshaft 5 rotates once such that the times Ti necessary for the rotation of the sections A0-A5 are calculated (Step S16: YES), the processing goes to Step S18. If the answer to Step S16 is NO, the processing returns to Step S12.

Processing of Steps S18 to S24 calculates an accumulation value of n values of the time necessary for the rotation of each one of the sections A0-A5 in order to calculate an average value of the n values of the time necessary for the rotation of each one of the sections A0-A5. Step S18 resets the value i to 0 and increments a value n_itgr. Step S20 adds the time Ti to an accumulation value ST(i) of the time Ti and increments the value i. Step S22 determines whether the value i is six. If the answer to Step S22 is YES, the processing goes to Step S24. If the answer to Step S22 is NO, the processing returns to Step S20. Step S24 determines whether the value n_itgr coincides with the value n. If the answer to Step S24 is YES, the process goes to Step S26. If the answer to Step S24 is NO, the processing returns to Step S12.

If the accumulation value of the n values of the time necessary for the rotation of each one of the sections A0-A5 is calculated (Step S24: YES), the processing goes to Step S26. Processing of Steps S26 to S32 calculates the average value Tib of the n values of the time necessary for the rotation of each one of the sections A0-A5 and the entire section average value Tba as the average value of the average values Tib of the respective sections A0-A5. Step S26 resets the values i, Tba to zero. Step S28 calculates the average value Tib by dividing the accumulation value ST(i) by the value n_itgr. Step S28 adds the average value Tib to the entire section average value Tba and increments the value i. Step S30 determines whether the value i is six. If the answer to Step S30 is YES, the processing goes to Step S32. If the answer to Step S30 is NO, the processing returns to Step S28. Step S32 divides the entire section average value Tba by six.

If the respective average values Tib and the entire section average value Tba are calculated, the processing goes to Step S34. Processing of Steps S34 to S38 calculates final learning values kTif. Step S34 resets the value i to 0. Step S36 calculates the learning value kTif by dividing a ratio of the average value Tib to the entire section average value Tba by the reference ratio kTni and increments the value i. Step S38 determines whether the value i is six. If the answer to Step S38 is YES, the processing goes to Step S40. If the answer to Step S38 is NO, the processing returns to Step S36. The reference ratios kTni should be preferably read out from the EEPROM 56. It is preferable that the ROM 54 stores only the programs defining the processing steps shown in FIG. 6 and the EEPROM 56 stores the reference ratios kTni in accordance with the type of the diesel engine 1. Thus, selective usage of the reference ratios kTni in accordance with the type of the diesel engine 1 is facilitated.

The reference ratios kTni are set at values expected when there is no structural error among the teeth 22 and the measurement of the time necessary for the rotation of the respective sections A0-A5 is started from the section A0. If the processing of Steps S34 to S38 is completed (Step S38: YES), Step S40 stores the learning values kTif in the EEPROM 56. Thus, the series of processing is ended once.

If the answer to Step S12 is NO, Step S42 initializes variables used in the series of processing, and the series of processing is ended once.

The present embodiment exerts following effects, for example.

(I) The angle error in each one of the sections A0-A5 is sensed by using the average value Tib of the n values of the time necessary for the rotation of the section. Each average value Tib is calculated by averaging the output of the crank angle sensor 40. Specifically, the rotation fluctuation of the crankshaft 5 is averaged. Therefore, by using the average values Tib, influence of the rotation fluctuation of the crankshaft 5 due to the complicated force applied to the crankshaft 5 or influence of the noise mixing in the output of the crank angle sensor 40 can be suitably inhibited when the angle error is sensed.

(II) The structural errors in the sections Ai are calculated based on the ratios of the average values Tib to the entire section average value Tba calculated by averaging the average values Tib. The averaged rotation fluctuation per rotation of the crankshaft 5 is used as the reference of the time necessary for the rotation of each section Ai. Thus, the accurate value can be used as the reference of the time necessary for the rotation of the section.

(III) The reference model for determining the reference of the deviation of the time necessary for the rotation of each section Ai with respect to the rotation time per section averaged through the entire sections is used to eliminate the deviation from the ratio kTi of the average value Tib of the section Ai to the entire section average value Tba. Thus, the influence of the rotation fluctuation of the crankshaft 5 can be eliminated more suitably. Specifically, the influence of the rotation fluctuation due to the cyclic force of the four-stroke cycle can be suitably eliminated when the learning values are calculated.

(IV) The start point of the calculation of the time necessary for the rotation of the sections Ai is fixed at the predetermined section (section A0 in the present embodiment). Thus, the reference model (reference ratios kTni) can be set at the values expected when the measurement is started from the predetermined section. As a result, the reference model can be set more accurately.

Figure 7A:
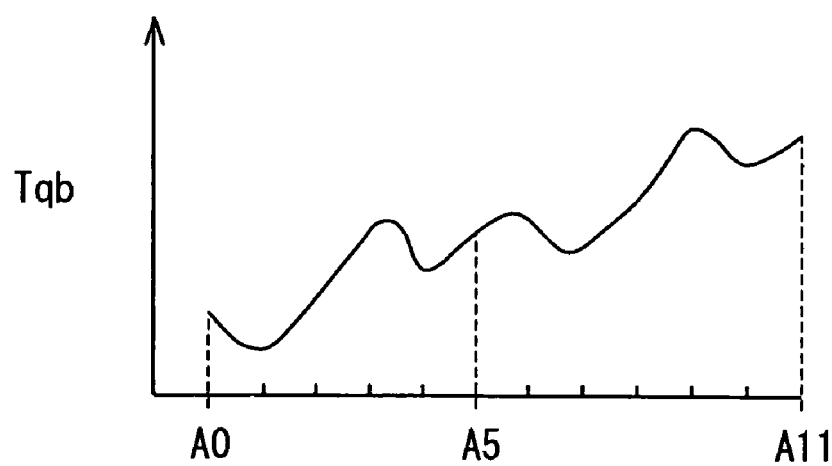
FIG. 7A is a graph showing an average value of time of rotation of a crankshaft according to a second example embodiment of the present invention.

Next, learning control according to a second example embodiment of the present invention will be described in reference to drawings. In the present embodiment, two rotations of the crankshaft 5 are used as the entire sections and are divided into sections Aq (q=0 to 11) consisting of sections Ai (i=0 to 5) and sections Ap (p=6 to 11). The sections Ap are advanced from the sections Ai by 360° CA (Ap=Ai+360° CA). In the setting of the sections Aq, the cam angle based on the output of the cam angle sensor 42 is used in addition to the crank angle based on the output of the crank angle sensor 40. As shown in FIG. 7A and following Expression 5, n values Tq_j (q=0 to 11, j=1 to n) of the time necessary for the rotation of each one of the sections A0-A11 are sampled and an average value Tqb of the n values is calculated for each one of the sections A0-A11.

$$T0b=(T0\_1+T0\_2+\ldots+T0\_n)/n,$$

$$\vdots$$

$$T11b=(T11\_1+T11\_2+\ldots+T11\_n)/n \qquad \text{(Expression 5)}$$

Each one of the average values Tqb is calculated from the n calculation values of the time. Therefore, the influence of the noise mixing in the output of the crank angle sensor 40 is sufficiently inhibited. The influence of the rotation fluctuation of the crankshaft 5 is contained. However, the influence is sufficiently inhibited. For example, the rotation fluctuation includes a rotation fluctuation caused by a cyclic force applied to the crankshaft 5 in the four-stroke cycle. As for the rotation fluctuation due to the cyclic force, the cyclic forces at different phases are not reflected in the respective average values Tqb in an averaged manner. The average values Tqb reflect only the influence of the cyclic forces at specific phases. Here, the phases deviated from each other by an integral multiple of 720° CA are defined as the same phases.

Figure 7B:
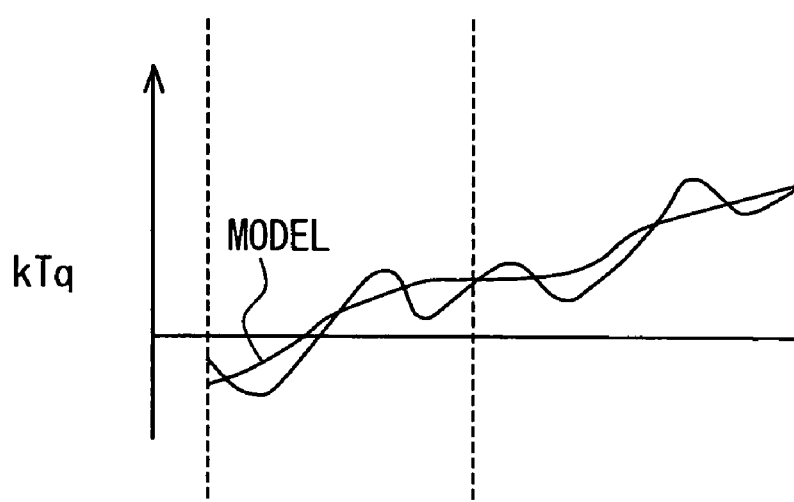
FIG. 7B is a graph showing a ratio of the average value of the time of the rotation of the crankshaft according to the FIG. 7A embodiment.

Then, as shown in FIG. 7B and following Expressions 6 and 7, an entire section average value Tba as an average of the average values Tqb is calculated and ratios kTq of the average values Tqb to the entire section average value Tba are calculated.

$$Tba=(T0b+T1b+\ldots+T11b)/12 \quad \text{(Expression 6)}$$

$$kT0=T0b/Tba,$$

$$\vdots$$

$$kT11=T11b/Tba \quad \text{(Expression 7)}$$

Figure 7C:
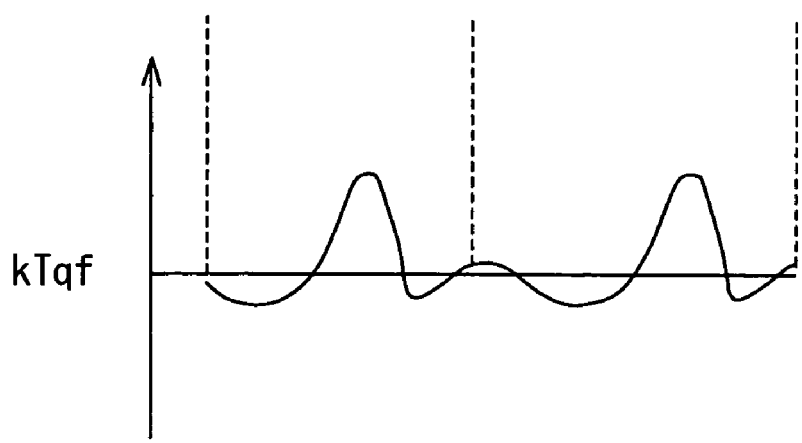
FIG. 7C is a graph showing a learning value of the time of the rotation of the crankshaft according to the FIG. 7A embodiment.

As shown in FIG. 7C and following Expression 8, ratios of the respective ratios kTq to a reference model (reference ratios kTnq) are calculated as final learning values kTqf.

$$kT0f=kT0/kTn0,$$

$$\vdots$$

$$kT11f=kT11/kTn11 \quad \text{(Expression 8)}$$

The reference model of the present embodiment consists of reference values expected as ratios of the average values of the time necessary for the rotation of the sections A0-A11 to the entire section average value in the case where there is no structural error in the intervals of the teeth 22. Thus, the reference model defines the respective reference ratios kTnq of the sections deviating from each other by 360° CA. Accordingly, reflection of the components of the cyclic force having different phases in the reference ratios kTnq of the respective sections Aq in an averaged manner is averted. Thus, the influences of the forces having different phases are reflected in the reference ratios kTnq different from each other. Thus, the cyclic force can be reflected in the reference model more suitably.

The learning values kTqf are calculated for the sections A0-A11 respectively. Thus, the influence of the cyclic force applied to the crankshaft 5 in the four-stroke cycle can be eliminated more accurately when the learning values kTqf are calculated.

If the learning values kTqf are learned at high accuracy, a difference between the learning values kTqf of the sections Ai, Ap deviating from each other by 360° CA becomes substantially zero. The learning values kTqf may be calculated respectively for the corresponding crank angle sections. Alternatively, a final learning value kTiff (i=0 to 5) may be calculated from learning values kTif, kTpf of the sections Ai, Ap deviating from each other by 360° CA. The final learning value kTiff may be calculated by averaging the learning values kTif, kTpf of the sections Ai, Ap deviating from each other by 360° CA. If either learning value tends to include a larger learning error than the other learning value, the final learning value kTiff may be calculated through weighted averaging of the learning values kTif, kTpf.

The present embodiment exerts a following effect (V) in addition to the effects similar to the effects (I) to (IV) of the first example embodiment.

(V) The two rotations of the crankshaft 5 are used as the entire sections, and the learning values kTqf are calculated for the respective sections A0-A11. Thus, the influence of the cyclic force applied to the crankshaft 5 in the four-stroke cycle is eliminated more suitably when the learning values are calculated.

Figure 8A:
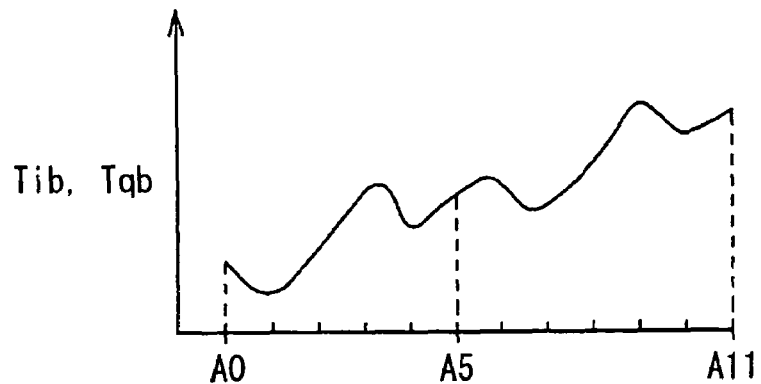
FIG. 8A is a graph showing an average value of time of rotation of a crankshaft according to a third example embodiment of the present invention.

Next, learning control according to a third example embodiment of the present invention will be described in reference to drawings. As shown in FIG. 8A and following Expression 9, average values Tqb of the respective sections A0-A11 are calculated.

$$T0b=(T0\_1+T0\_2+\ldots+T0\_n)/n,$$

$$\vdots$$

$$T11b=(T11\_1+T11\_2+\ldots+T11\_n)/n \quad \text{(Expression 9)}$$

Figure 8B:
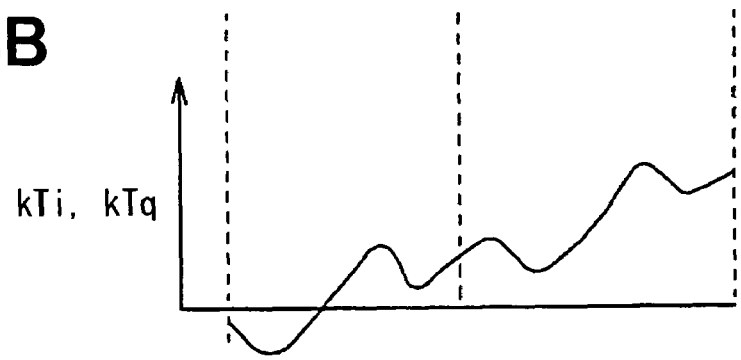
FIG. 8B is a graph showing a ratio of the average value of the time of the rotation of the crankshaft according to the FIG. 8A embodiment.

As shown in FIG. 8B and following Expressions 10 and 11, an entire section average value Tba and ratios kTq of the average values Tqb to the entire section average value Tba are calculated for the respective sections A0-A11.

$$Tba=(T0b+T1b+\ldots+T11b)/12 \quad \text{(Expression 10)}$$

$$kT0=T0b/Tba$$

$$\vdots$$

$$kT11=T11b/Tba \quad \text{(Expression 11)}$$

The present embodiment does not use the reference model. Instead, as shown by following Expression 12, the learning value kTif of the section Ai is calculated from the ratios kTi, kTp of the sections Ai, Ap (i=0 to 5, p=i+6) deviating from each other by 360° CA.

$$kT0f=F0(kT0,kT6),$$

$$\vdots$$

$$kT5f=F5(kT5,kT11) \quad \text{(Expression 12)}$$

The phases of the cyclic forces applied to the crankshaft 5 in the four-stroke cycle are different from each other between the sections Ai, Ap deviating from each other by 360° CA. Therefore, the deviation between the ratios kTi, kTp reflects the difference in the forces applied to the crankshaft 5 due to the difference in the phases of the cyclic forces. Therefore, the influence of the cyclic force itself can be sensed from the deviation. The learning values kTif are calculated from the ratios kTi, kTp by using a map (kTif=Fi (kTi, kTp)). The map Fi may be made in advance through experiment and the like. Alternatively, the learning value may be set simply based on comparison between the ratios kTi, kTp. For example, the smaller one out of the ratios kTi, kTp may be used as the final learning value.

In order to sense the influence of the cyclic force, it is preferable to sufficiently inhibit the influence of the attenuation of the rotation speed of the crankshaft 5. Therefore, the sampling number n for calculating the average values should be preferably increased sufficiently.

The present embodiment exerts effects similar to those of the second example embodiment.

Figure 9:
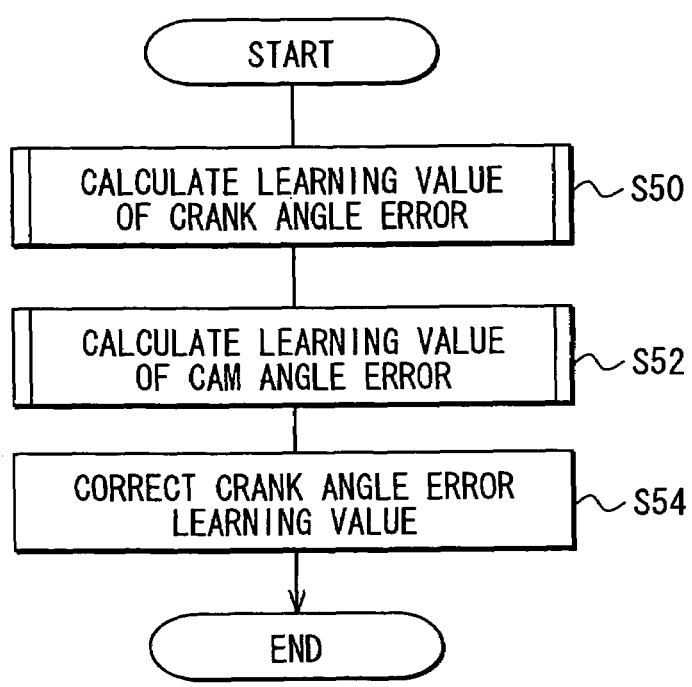
FIG. 9 is a flowchart showing processing steps of learning control of a crank angle error according to a fourth example embodiment of the present invention.
Figure 10:
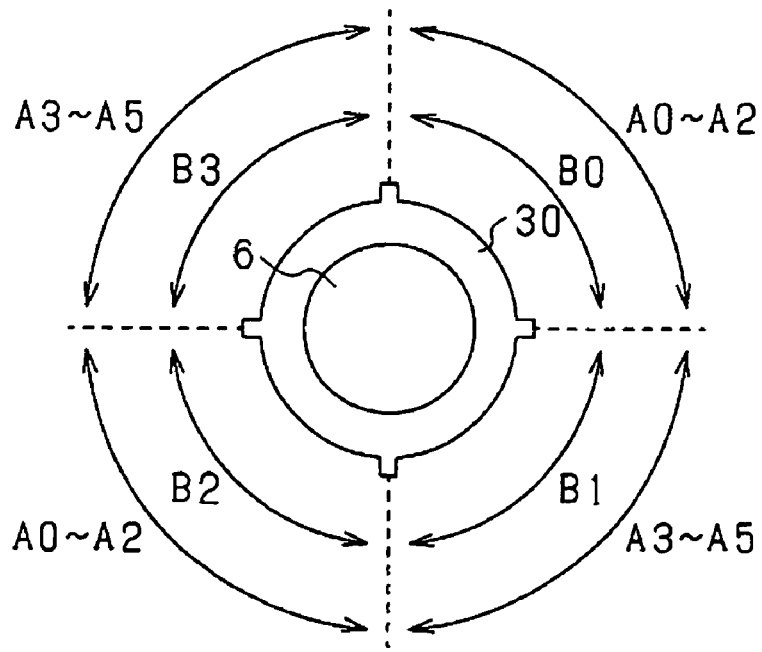
FIG. 10 is a diagram showing a rotor provided on a camshaft according to the FIG. 9 embodiment.

Next, learning control according to a fourth example embodiment of the present invention will be described in reference to drawings. FIG. 9 illustrates processing steps for calculating learning values for compensating for a crank angle error according to the present embodiment. The ECU 50 repeatedly executes the processing in a predetermined cycle, for example. In the series of processing, first, Step S50 performs processing similar to the processing shown in FIG. 6 to calculate the learning values of the crank angle error. Then, Step S52 calculates learning values of a cam angle error. As shown in FIG. 10, Step S52 calculates the learning values for compensating for the structural errors of four sections B0-B3 defined by the teeth 32 of the rotor 30 provided on the camshaft 6. The sections B0, B2 of the cam angle correspond to the sections A0-A2 of the crank angle.

The sections B1, B3 of the cam angle correspond to the sections A3-A5 of the crank angle.

Figure 6:
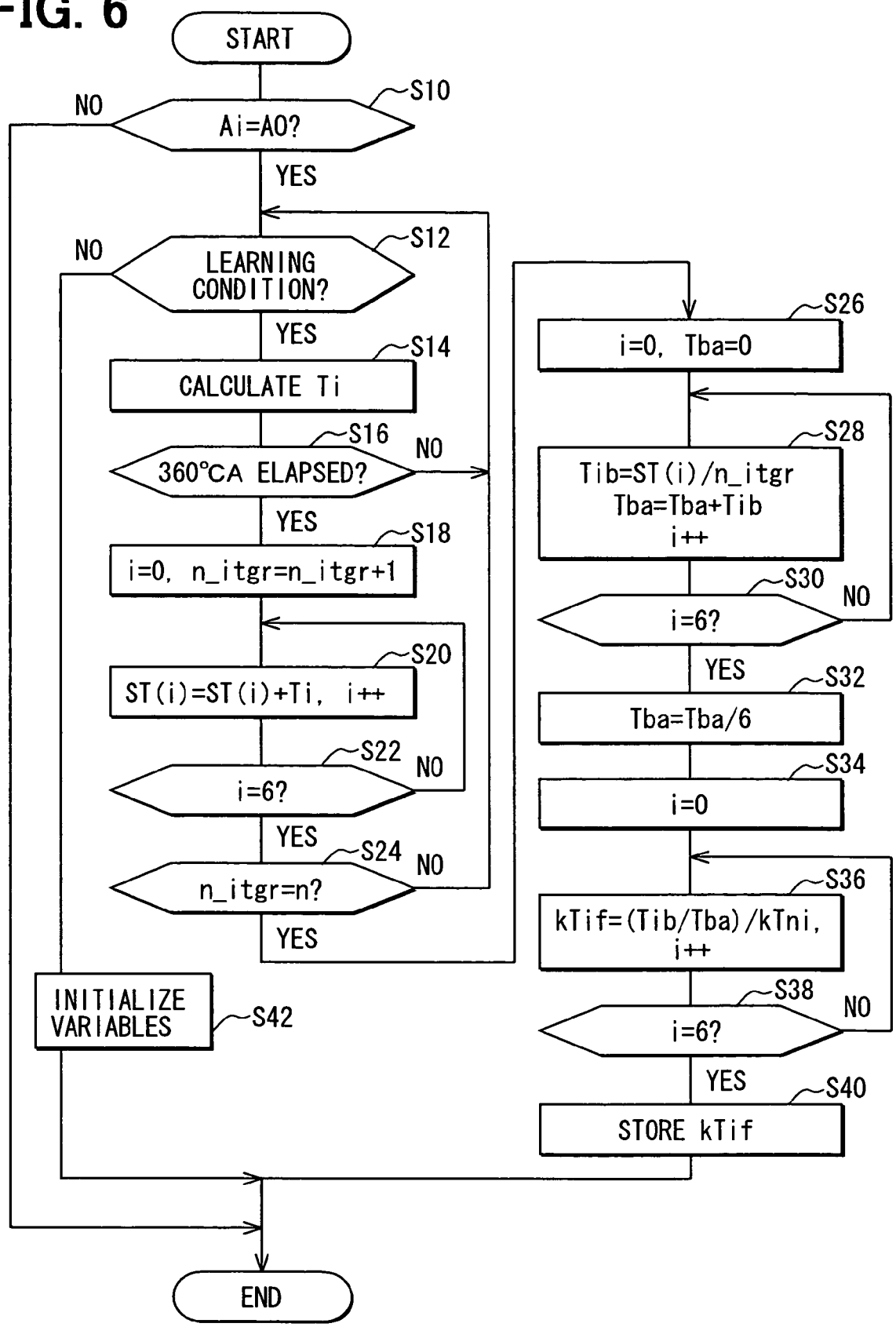
FIG. 6 is a flowchart showing processing steps of learning control of a crank angle error according to the FIG. 1 embodiment.

The calculation of the learning values of the cam angle error is similar to the processing shown in FIG. 6. As shown by following Expression 13, average values TrB (r=0 to 3) of respective m values Br_s (s=1 to m) of the time necessary for the rotation of the respective sections Br are calculated.

$$T0B=(B0\_1+B0\_2+\ldots+B0\_m)/m,$$

$$\vdots$$

$$T3B=(B3\_1+B3\_2+\ldots+B3\_m)/m \quad \text{(Expression 13)}$$

Then, as shown by following Expression 14, an entire section average value TBa as an average value of the average values TrB is calculated, ratios of the average values TrB of the respective sections Br to the entire section average value TBa are calculated, and the learning values BTrf of the respective sections Br are calculated by dividing the ratios TrB/TBa by a reference model (reference ratios BTnr).

$$BT0f = \frac{1}{BTn0} \frac{T0B}{\frac{1}{4}(T0B+\cdots+T3B)} \quad \text{(Expression 14)}$$
$$= \frac{1}{BTn0} \frac{T0B}{TBa},$$

$$\vdots$$

$$BT3f = \frac{1}{BTn3} \frac{T3B}{\frac{1}{4}(T0B+\cdots+T3B)}$$
$$= \frac{1}{BTn3} \frac{T3B}{TBa}$$

Step S54 shown in FIG. 9 corrects the learning values of the crank angle based on the cam angle having undergone the learning correction.

If the learning values are learned correctly at Steps S50 and S52, the time necessary for the rotation of the section B0 or the section B2 should coincide with the time necessary for the rotation of the sections A0-A2. The time necessary for the rotation of the section B1 or the section B3 should coincide with the time necessary for the rotation of the sections A3-A5.

If the calculation values of the time necessary for the rotation of the sections A0-A2 during two rotations of the crankshaft 5 are calculated as values T0_1, T1_1, T2_1 and values T0_2, T1_2, T2_2 before the learning correction and the calculation values of the time necessary for the rotation of the sections B0, B2 during the two rotations of the crankshaft 5 are calculated as values TB0, TB2, following Expression 15 should be established when the learning values are completely true values. The time TB0 is calculated based on the output of the crank angle sensor 40 sensed before the time TB2 is sensed.

$$TB0/BT0f=T0\_1/kT0f+T1\_1/kT1f+T2\_1/kT2f,$$

$$TB2/BT2f=T0\_2/kT0f+T1\_2/kT1f+T2\_2/kT2f \quad \text{(Expression 15)}$$

Reliability of the learning values of the cam angle error and the learning values of the crank angle error can be quantified based on the deviation between the right member and the left member of each one of the above two expressions. The present embodiment corrects the learning values of the crank angle error or the learning values of the cam angle error if the right member does not coincide with the left member. This correction can be performed by assuming that the average value of the right member and the left member is the true value of the time necessary for the rotation of the section B0 or the section B2 and by correcting the learning values to conform the right member and the left member to the true value, for example.

The present embodiment exerts a following effect (VI) in addition to the effects (I) to (IV) of the first example embodiment.

(VI) The learning values of the cam angle error are calculated and used to correct the learning values of the crank angle error. Thus, more suitable learning values of the crank angle error can be obtained.

The calculating method of the learning values for compensating for the crank angle error is not limited to the method shown in FIG. 6 in the fourth example embodiment. For example, the method of the second or third example embodiment may be used.

The number of the cylinders of the multi-cylinder engine may be set arbitrarily. Even in this case, the effects of the above example embodiments can be exerted. For example, a single-cylinder internal combustion engine may be used. Even in this case, the combustion cycle is 720° CA. Therefore, the methods of the above-described example embodiments are effective.

The learning values of the sections A0-A5 and the like are not limited to the values set based on the ratios of the average values of the respective sections to the entire section average value Tba. The learning values may be set based on differences between the average values of the respective sections and the entire section average value Tba. In this case, the reference model should be preferably set at differences between the average values of the respective sections and the entire section average value Tba expected when there is no structural error.

The effects (I), (II) of the first example embodiment can be exerted even if the reference model is not used.

The entire sections are not limited to the one rotation or the two rotations of the crankshaft 5. For example, in the case where a force cyclically changing in accordance with the rotation angle of the crankshaft 5 is applied to the crankshaft 5 by a certain member, it is effective to set the entire sections at the cycle or at the common multiples of the cycle and 360° CA or 720° CA.

The reference used in the sensing of the structural error of the section Ai or the section Ap is not limited to the entire section average value. For example, any one of the sections A0-A5 may be used as the reference. Even in this case, the relative angle error between the sections can be sensed. The variation in the injection characteristics of the fuel injection valves of the cylinders can be compensated for by using the thus-calculated learning values.

The method of using the learning values is not limited to the learning of the learning values for correcting the variation in the fuel injection characteristics. For example, in certain control for starting the fuel injection at a predetermined crank angle, time since certain one of the teeth 32 is sensed until a predetermined crank angle occurs is calculated, and the fuel injection is started when the time elapses. In such a case, accurate calculation of the rotation speed of the respective sections is important to improve control accuracy of the injection start timing. Therefore, it is effective to set the injection start timing by using the learning values.

The storage device for storing the reference model or the learning values is not limited to the EEPROM 56. The storage device should be preferably a rewritable nonvolatile memory such as a backup RAM, which is supplied with power regardless of presence or absence of power supply to the ECU 50, or a memory such as EEPROM that maintains the data regardless of the presence or absence of power supply. The reference model may be stored in the ROM 54.

Next, learning control according to a fifth example embodiment of the present invention will be described in reference to drawings. The fuel injection learning program 60 according to the present embodiment calculates differences between operation amounts, which are required to conform differences among increases of rotation speed accompanying the fuel injections in the respective cylinders to zero, and a reference operation amount as the learning values of the respective cylinders. By using the calculated learning values, the increases of the rotation speed calculated based on the output of the crank angle sensor 40 can be substantially equalized to each other. However, in the case where there is a structural error in the intervals of the teeth 22, the rotation angle or the rotation speed calculated based on the output of the crank angle sensor 40 deviates from the actual rotation angle or the actual rotation speed. If there is a deviation, the variation in the injection characteristics of the fuel injection valves 2 of the cylinders cannot be compensated for by using the learning values.

Figure 11A:
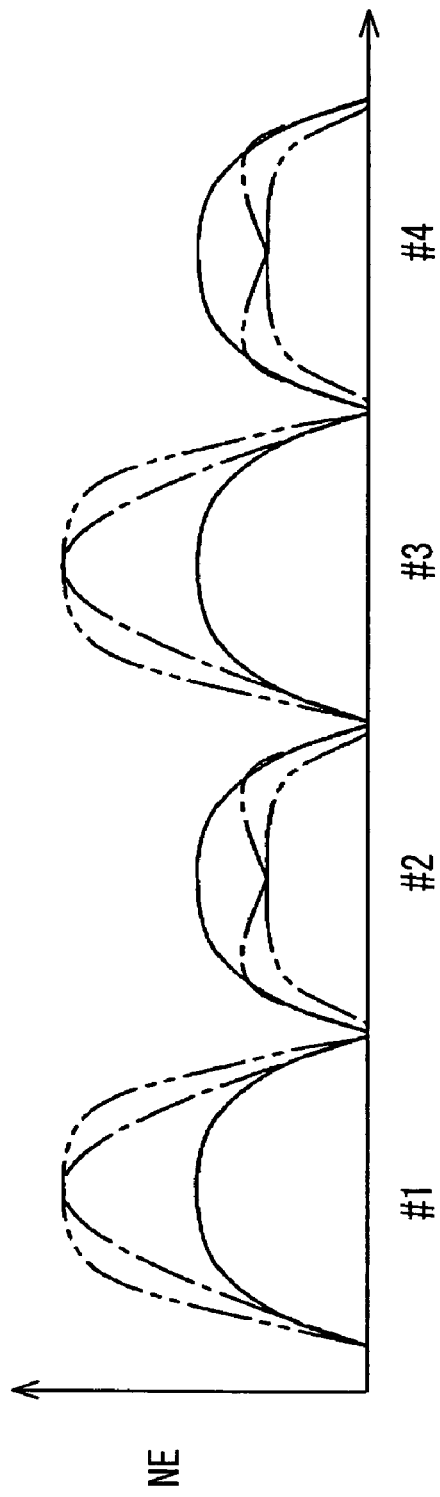
FIG. 11A is a diagram showing an output of a crank angle sensor according to a fifth example embodiment of the present invention.
Figure 11B:
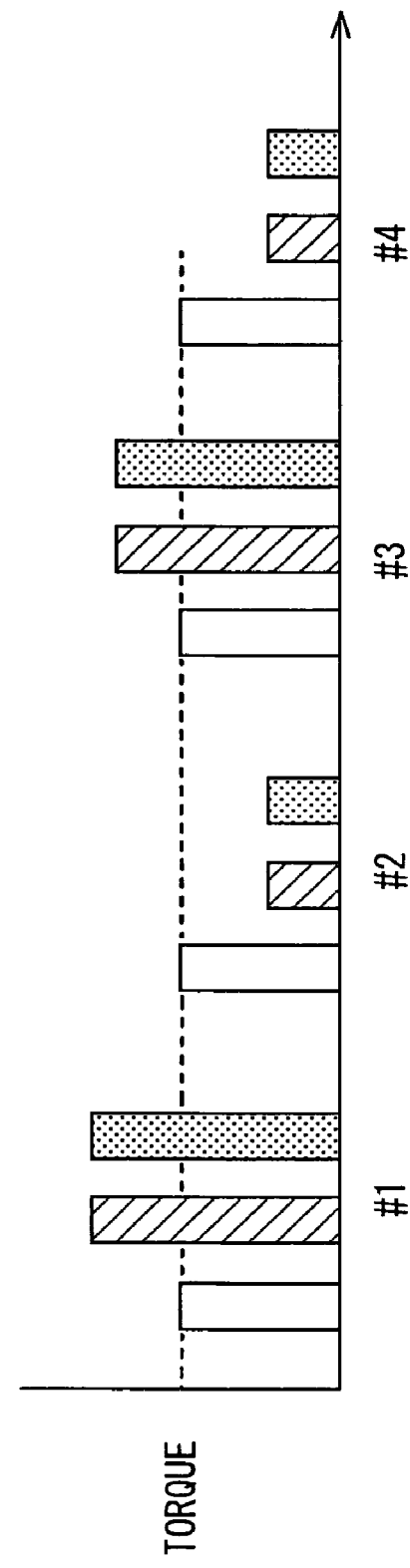
FIG. 11B is a diagram showing a torque equivalent value according to the FIG. 11A embodiment.

A sensing result of the crank angle sensor 40 accompanying the fuel injections in the respective cylinders #1-#4 is shown in FIG. 1A. Solid lines in FIG. 11A indicate the sensing result in the case where there is no structural angle error in the teeth 22. Chained lines indicate the sensing result in the case where there is the angle error in the teeth 22. Chain double-dashed lines indicate the sensing result in the case where there is a variation in the injection characteristics of the fuel injection valves 2. As shown in FIG. 11A, there is a variation among the cylinders in the sensing result of the crank angle sensor 40 about the rotation increases accompanying the fuel injections in both of the cases where there is the angle error in the teeth 22 and where there is the variation in the injection characteristics of the fuel injection valves 2. FIG. 11B shows torque equivalent values converted from the sensing result of the crank angle sensor 40 shown in FIG. 11A. Blank bars, shaded bars and dotted bars in FIG. 11B indicate the torque equivalent values corresponding to the sensing results shown by the solid lines, the chain double-dashed lines and the chained lines in FIG. 11A respectively.

Figure 12:
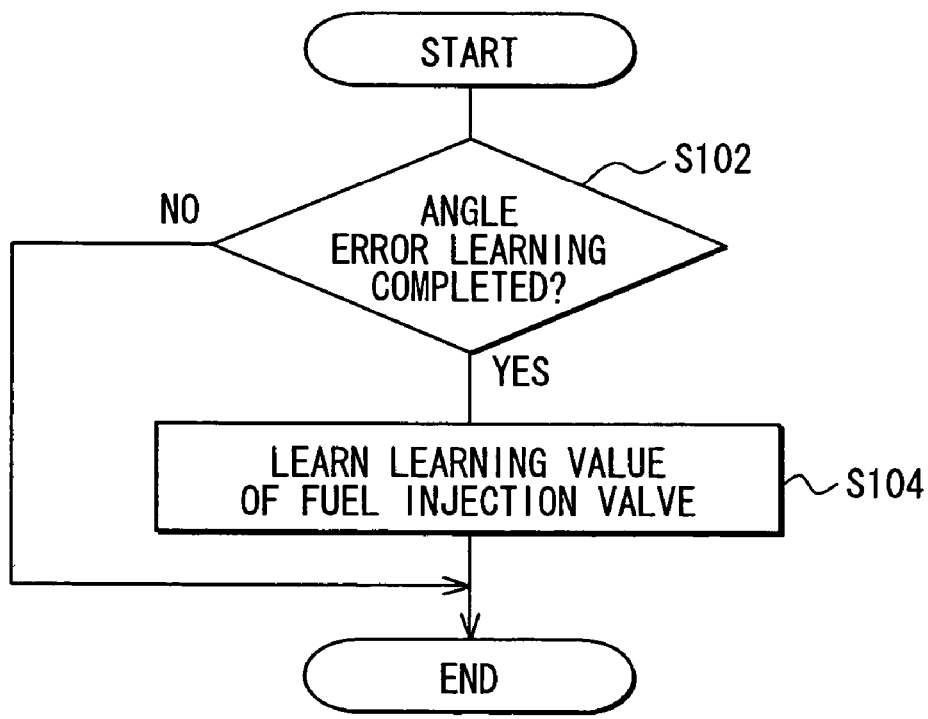
FIG. 12 is a flowchart showing processing steps of learning control of a learning value of a fuel injection valve according to the FIG. 11A embodiment.

Thus, when there is a variation in the rotation increases sensed by the crank angle sensor 40, it cannot be specified whether the variation is due to the variation in the injection characteristics of the fuel injection valves 2 or due to the angle error. Therefore, in the present embodiment, the angle error is learned (Step S102: YES), and then, the learning value of the fuel injection valve 2 is learned (Step S104) as shown by a flowchart of FIG. 12. The ECU 50 repeatedly executes the processing steps of FIG. 12 in a predetermined cycle.

Figure 13A:
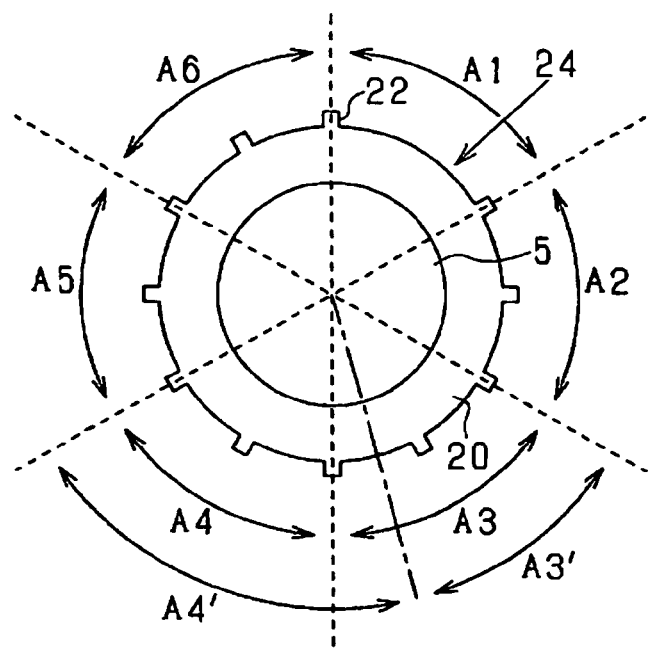
FIG. 13A is a diagram showing a rotor provided on a crankshaft according to the FIG. 11A embodiment.

The structural error of the intervals among the teeth 22 will be explained in reference to FIGS. 13A to 13C. In FIG. 13A, a section defined by two teeth 22 on both sides of the missing tooth portion 24 on the rotor 20 provided on the crankshaft 5 is named as a section A1. Sections A2-A6 are defined along a clockwise direction from the section A1 at an interval of 60° CA. The sections A1-A6 in FIG. 13A show an example in which no deviation is generated among the teeth 22. Therefore, the sections A1-A6 are equal to each other. Sections A3', A4' in FIG. 13A show an example in which the deviation is generated in the teeth 22. Accordingly, the sections A3', A4' deviate from the sections A3, A4.

Figure 13B:
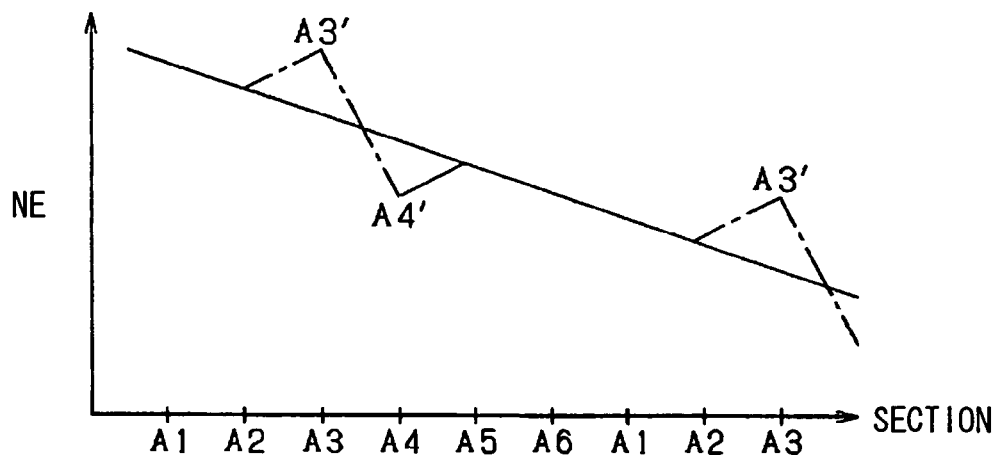
FIG. 13B is a graph showing rotation speed of the crankshaft according to the FIG. 11A embodiment.
Figure 13C:
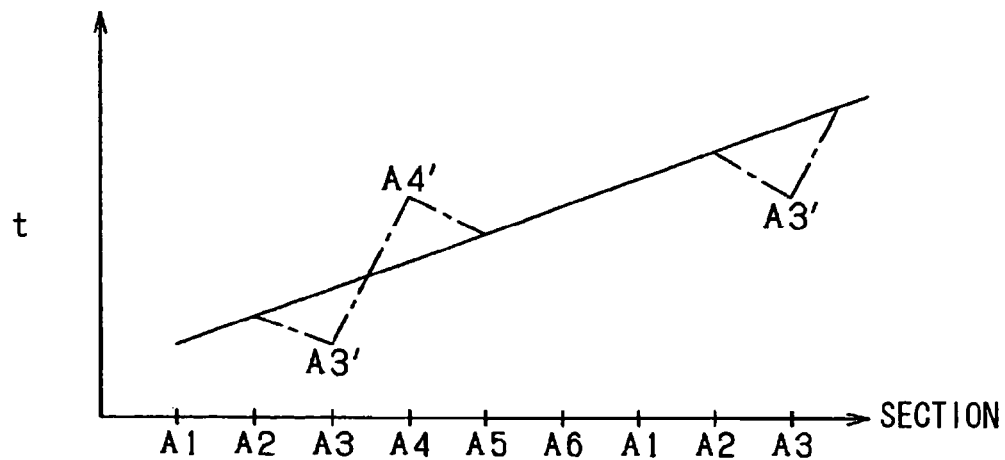
FIG. 13C is a graph showing time of rotation of the crankshaft according to the FIG. 11A embodiment.

FIG. 13B illustrates rotation speed NE of the sections A1-A6 during the fuel cutting control for stopping the fuel injection contributing to generation of torque of the crankshaft 5 of the diesel engine 1. FIG. 13C shows time (elapsed time) t necessary for the rotation of the sections A1-A6 during the fuel cutting control. In the example shown by solid lines in FIGS. 13B and 13C, there is no structural deviation among the teeth 22. As shown in FIGS. 13B and 13C, due to the fuel cutting control, the rotation speed NE gradually decreases and the elapsed time t gradually lengthens. The rotation speed NE sensed when the structural deviation is generated in the intervals of the teeth 22 is shown by a chained line in FIG. 13B. As shown by the chained line in FIG. 13B, the rotation speed NE increases once in the section A3' and becomes smaller than the actual value in the section A4'. The elapsed time t sensed when the structural deviation is generated in the intervals of the teeth 22 is shown by a chained line in FIG. 13C. As shown by the chained line in FIG. 13C, the elapsed time t decreases once in the section A3' and becomes larger than the actual value in the section A4'.

For example, even if there is no variation in the injection characteristics of the fuel injection valves 2, the variation is generated in the increase of the rotation speed NE as shown by the chained line in FIG. 11A in the case where the compression top dead centers of the first and third cylinders #1, #3 exist in the section A1, the compression top dead centers of the second and fourth cylinder #2, #4 exist in the section A4, and the angle error shown in FIG. 13A exists in the sections A3, A4. Therefore, in the present embodiment, the sections A1-A3 corresponding to the combustion strokes of the first and third cylinders #1, #3 are grouped into a first group, and the sections A4-A6 corresponding to the combustion strokes of the second and fourth cylinders #2, #4 are grouped into a second group. Thus, the angle range of the crankshaft 5 is grouped. Then, the variations in the angle ranges of the respective groups due to the structural error are corrected. By performing the correction (standardization) for equalizing the angle ranges of the two groups, generation of the variation in the sensing values of the rotation increases accompanying the combustion strokes of the respective cylinders due to the angle error can be averted during the learning of the variation in the injection characteristics of the fuel injection valves 2.

Figure 14:
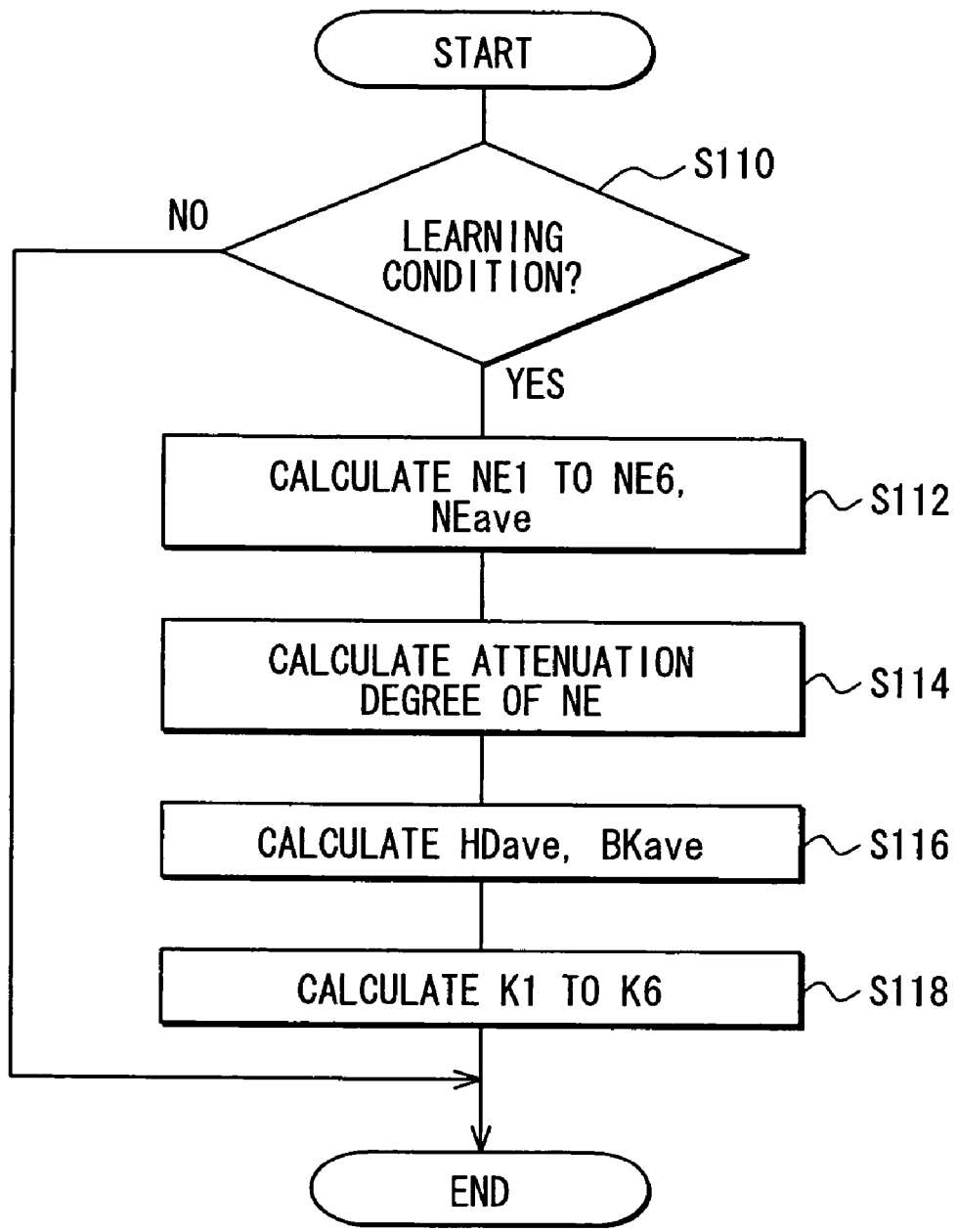
FIG. 14 is a flowchart showing processing steps for sensing an angle error according to the FIG. 11A embodiment.

FIG. 14 shows processing steps of the crank angle error learning program 62 according to the present embodiment. The ECU 50 repeatedly executes the processing in a predetermined cycle, for example. In the series of processing, first, Step S110 determines whether the learning condition is established. The learning condition is established when all of following conditions are established: (i) the shift operation section 12 is at the neutral range; (ii) the rotation speed is in a predetermined range; and (iii) the fuel cutting control is in progress. The condition (i) is employed to perform the learning control under a condition that conforms the torque applied from the driving wheel side to the crankshaft 5 to substantially zero. By establishing the condition (i), the fluctuation of the torque applied to the crankshaft 5 due to the torque fluctuation applied from the driving wheel side can be averted. The condition (ii) is employed to perform the learning control under a condition that prevents the fluctuation of the force applied to the crankshaft 5 from increasing excessively. The condition (iii) is employed to avert the rotation fluctuation of the crankshaft 5 due to the combustion strokes. The fuel cutting control is performed during deceleration of the vehicle, for example.

Figure 15:
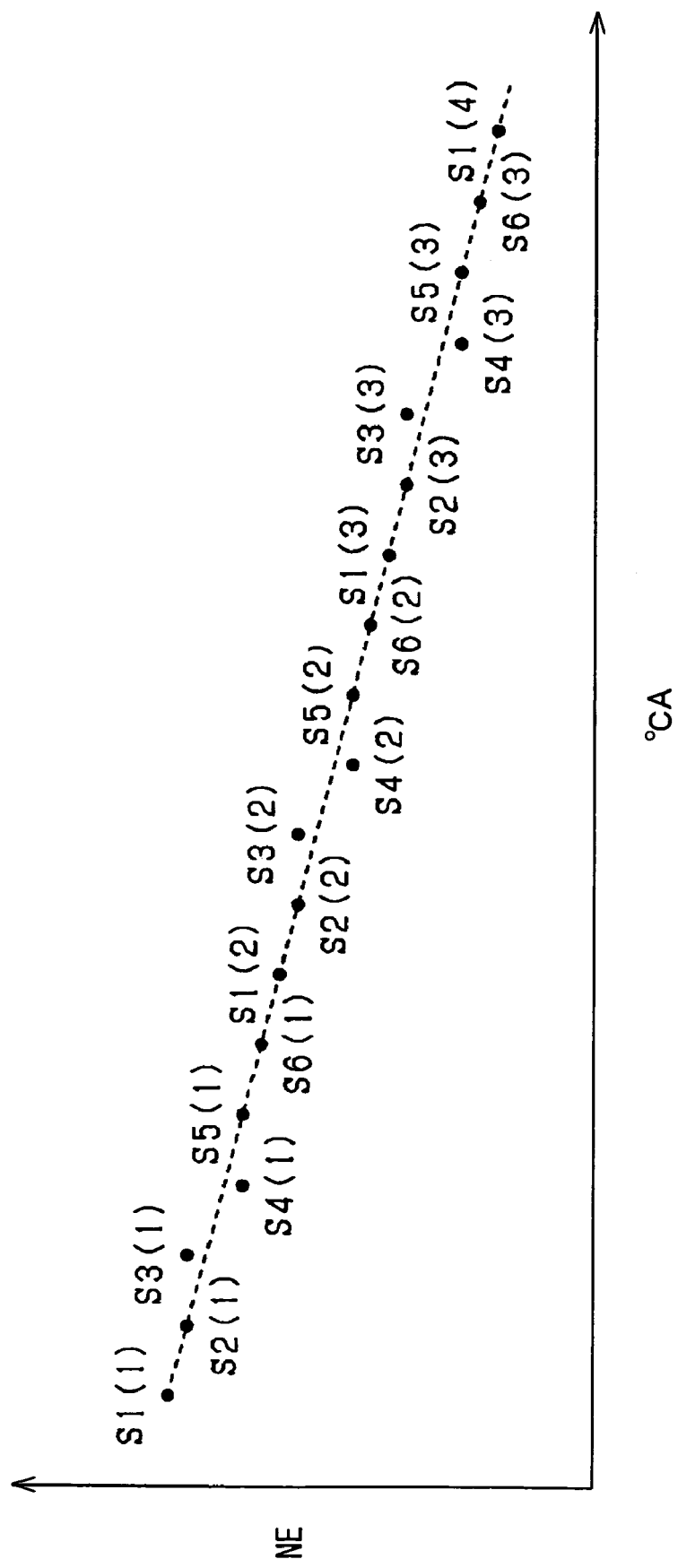
FIG. 15 is a diagram showing the rotation speed of the crankshaft according to the FIG. 11A embodiment.

If the learning condition is established, Step S112 calculates average values NE1-NE6 of the rotation speeds S1-S6 of the respective sections A1-A6 shown in FIG. 15 and an average value NEave of the rotation speeds S1-S6 in the entire sections A1-A6 as shown by following Expressions 16 and 17.

$$NE1 = \frac{1}{n}(S1(1) + S1(2) + \cdots + S1(n)),$$
$$NE2 = \frac{1}{n}(S2(1) + S2(2) + \cdots + S2(n)),$$
$$\vdots$$
$$NE6 = \frac{1}{n}(S6(1) + S6(2) + \cdots + S6(n))$$

(Expression 16)

$$NEave = \frac{1}{6}(NE1 + NE2 + NE3 + NE4 + NE5 + NE6)$$

(Expression 17)

FIG. 15 shows an attenuation mode of the rotation speeds S1-S6 of the respective sections A1-A6. For example, an average value NE1 of the rotation speeds S1(1)-S1(n) of the rotation of the section A1 through n times of 720° CA is calculated as the average value of the rotation speed of the section A1. An average value of the average values NE1-NE6 of the rotation speeds of the respective sections A1-A6 is calculated as the entire section average value NEave. Thus, instead of directly using the rotation speeds of the sections A1-A6, the average values of the speeds are used to inhibit the influence of the actual rotation fluctuation of the crankshaft 5 due to the force applied to the crankshaft 5 or mixing of the noise in the output of the crank angle sensor 40.

The rotation speed NE of the crankshaft 5 is cyclically minimized near the compression top dead centers of the respective cylinders. This does not mean that a cyclic force having a cycle of timing of the compression top dead center is applied to the crankshaft 5. For example, the force of the piston 3 of the first cylinder #1 for restricting the rotation of the crankshaft 5 through the connecting rod 4 becomes specifically strong at the compression top dead center of the first cylinder #1. The force of the piston 3 of the second cylinder #2 for restricting the rotation of the crankshaft 5 through the connecting rod 4 becomes specifically strong at the compression top dead center of the second cylinder #2. The pistons 3 of the cylinders #1-#4 apply the forces to the different points on the crankshaft 5 through the connecting rods 4. It is because the connecting rods 4 connected with the respective pistons 3 are connected to the crankshaft 5 at positions different from each other. Therefore, the force of the crankshaft 5 to continue the rotation by inertia after the fuel cutting control and the forces of the pistons 3 of the respective cylinders #1-#4 to restrict the rotation of the crankshaft 5 through the connecting rods 4 cause a twisting force in the crankshaft 5 in a cycle of 720° CA.

The rotation fluctuation is attenuated in accordance with the decrease in the rotation speed NE of the crankshaft 5. The twisting force is also attenuated. Moreover, the twisting force generated by the restricting force applied to the crankshaft 5 by the piston 3 through the connecting rod 4 at the compression top dead center of a certain cylinder and the inertia of the crankshaft 5 can cause a reversed twisting force applied to the crankshaft 5 afterward due to the resilience of the crankshaft 5 and the like.

Thus, the force applied to the crankshaft 5 during the fuel cutting control fluctuates in a complicated manner. Accordingly, the rotation speed NE of the crankshaft 5 also fluctuates in a complicated manner. In the present embodiment, the above-described average values are used to minimize the influence of the fluctuation and to minimize the influence of the noise mixing in the output of the crank angle sensor 40 when the structural error of the intervals of the teeth 22 is sensed.

Figure 16A:
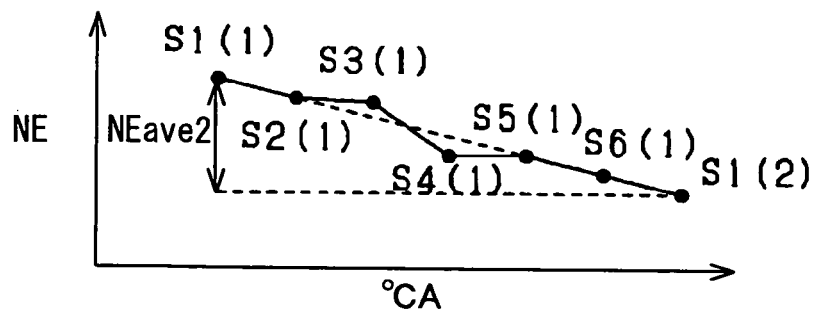
FIGS. 16A and 16B are graphs showing the rotation speed of the crankshaft according to the FIG. 11A embodiment.

Following Step S114 shown in FIG. 14 calculates an attenuation degree of the rotation speed of one of the sections A1-A6 during one rotation of the crankshaft 5. More specifically, as shown in FIG. 16A, a decrease NEave2 is calculated by subtracting the rotation speed S1(2) of the section A1 sampled at the second time from the rotation speed S1(1) sampled at the first time (NEave2=S1(1)−S1(2)). The decrease NEave2 suitably quantifies the attenuation degree of the rotation speed NE of the crankshaft 5 accompanying the fuel cutting control even if there is an angle error in the section A1. In the case where there is a linear relation in which the rotation speed NE decreases in proportion to the increase of the rotation angle CA as shown by a broken line in FIG. 15, the decrease NEave2 is calculated as substantially the same value regardless of which one of the sections A1-A6 is used.

Figure 16B:
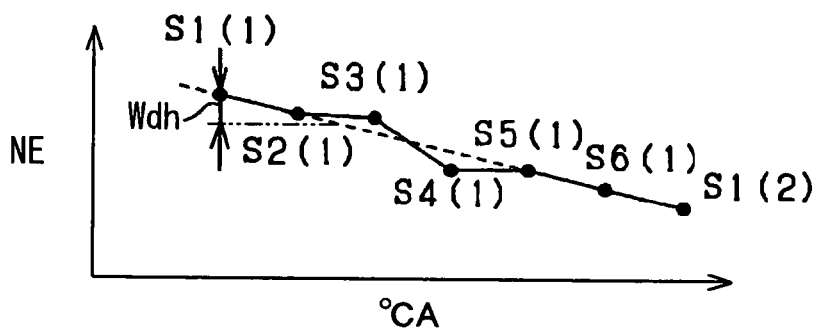
Figure 16C:
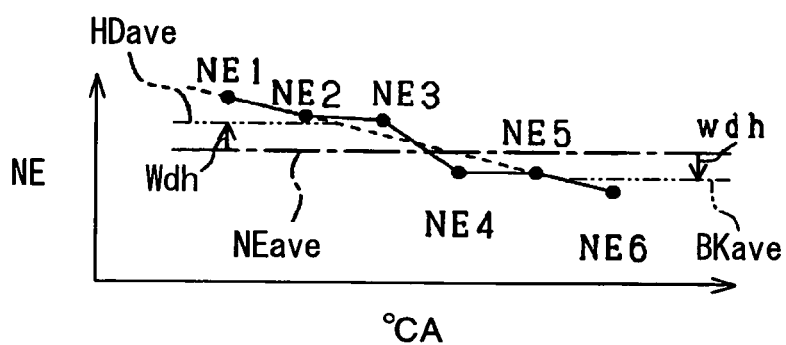
FIG. 16C is a graph showing an average value of the rotation speed of the crankshaft according to the FIG. 11A embodiment.

Then, following Step S116 shown in FIG. 14 calculates respective average values of the rotation speeds of the first group and the second group as reference values HDave, BKave of the first and second groups. Here, as shown in FIG. 16B, a decrease Wdh of the rotation speed per 90° CA is calculated by dividing the decrease NEave2 by four (Wdh=NEave2/4). Then, as shown in FIG. 16C, the reference value HDave of the rotation speed of the first group is calculated by adding the decrease Wdh to the entire section average value NEave (HDave=NEave+Wdh), and the reference value BKave of the rotation speed of the second group is calculated by subtracting the decrease Wdh from the entire section average value NEave (BKave=NEave−Wdh). The entire section average value NEave is used because only the inclination of the attenuation line shown by the broken line in FIG. 16A can be grasped from the decrease NEave2 but the decrease NEave2 is not enough to determine the attenuation line. In FIG. 16C, the entire section average value NEave is used as the intercept information of the attenuation line.

Then, following Step S118 calculates correction values K1-K6 for correcting the deviations of the average values of the rotation speeds of the sections in the respective groups with respect to the reference values of the same groups. This is a method for equalizing the angle ranges of the first group and the second group. To be more exact, a ratio HD of an average value of the average values NE1-NE3 of the first group to the reference value HDave is calculated as shown by following Expression 18.

$$HD = \frac{NE1 + NE2 + NE3}{3} \times \frac{1}{HDave}$$

(Expression 18)

A ratio BK of an average value of the average values NE4-NE6 of the second group to the reference value BKave is also calculated as shown by following Expression 19.

$$BK = \frac{NE4 + NE5 + NE6}{3} \times \frac{1}{BKave} \quad \text{(Expression 19)}$$

Then, an average value AVE of the ratio HD and the ratio BK is calculated (AVE=(HD+BK)/2). The inverse number of the average value AVE is a standardization factor for conforming the average values of the rotation speeds of the sections A1-A6 to the entire section average value NEave in the correction. Then, the average values NE1-NE3 of the rotation speeds of the sections A1-A3 of the first group are divided by the reference value HDave and are standardized with the value 1/AVE to calculate the correction values K1-K3 as shown by following Expression 20.

$$K1 = \frac{NE1}{HDave} \cdot \frac{1}{AVE},$$
$$K2 = \frac{NE2}{HDave} \cdot \frac{1}{AVE}, \quad \text{(Expression 20)}$$
$$K3 = \frac{NE3}{HDave} \cdot \frac{1}{AVE}$$

Likewise, the average values NE4-NE 6 of the rotation speeds of the sections A4-A6 of the second group are divided by the reference value BKave and are standardized by the value 1/AVE to calculate the correction values K4-K6 as shown by following Expression 21.

$$K4 = \frac{NE4}{HDave} \cdot \frac{1}{AVE},$$
$$K5 = \frac{NE5}{HDave} \cdot \frac{1}{AVE}, \quad \text{(Expression 21)}$$
$$K6 = \frac{NE6}{HDave} \cdot \frac{1}{AVE}$$

By using the correction values K1-K6, the rotation angle ranges of the first group and the second group can be equalized to each other. As a result, the variation in the injection characteristics of the fuel injection valves 2 can be sensed highly accurately.

The present embodiment exerts following effects (VII) to (X), for example.

(VII) The attenuation degree of the rotation speed of the crankshaft 5 due to the fuel cutting control is estimated based on the rotation speeds S1(1), S1(2) of the predetermined section (here, the section A1) at the start and the end of the integral multiple of one rotation of the crankshaft 5. Thus, the attenuation degree of the rotation speed is calculated accurately.

(VIII) Instead of the rotation speeds of the respective sections A1-A6 or the average value of the rotation speeds of the entire sections, the average values NE1-NE6 of the rotation speeds of the sections A1-A6 or the entire section average value NEave of the average values NE1-NE 6 is used. Thus, the influence of the rotation fluctuation of the crankshaft 5 caused by the complicated force applied to the crankshaft 5 or the influence of the noise mixed in the output of the crank angle sensor 40 can be suitably inhibited when the angle error is sensed.

(IX) The reference values HDave, BKave of the average values of the rotation speeds of the respective groups are calculated accurately based on the entire section average value and the attenuation degree. By correcting the average values NE1-NE6 of the sections A1-A6 of the respective groups with the reference values HDave, BKave of the respective groups, the angle ranges of the respective groups are set to be equal to each other at high accuracy.

(X) As the attenuation mode of the crankshaft 5 accompanying the fuel cutting control, the attenuation line, with which the rotation speed decreases in proportion to the increase of the rotation angle, is assumed. Thus, the attenuation degree of the rotation speed can be calculated easily and suitably.

Figure 17:
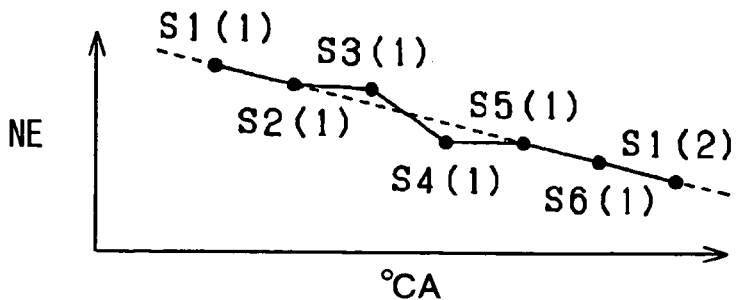
FIG. 17 is a graph showing rotation speed of a crankshaft according to a sixth example embodiment of the present invention.

Next, learning control according to a sixth example embodiment of the present invention will be described in reference to drawings. In the present embodiment, the attenuation degree (decrease NEave2) is calculated at Step S114 of FIG. 14 in a mode shown in FIG. 17. For example, by using the rotation speeds S1(1)-S1($n$) sampled at the specific section (here, section A1), the decrease NEave2 is calculated by averaging the differences between sampling values S1($i$), S1($i$+1) ($i$=1 to n) temporally adjacent to each other as shown by following Expression 22.

$$NEave2 = \quad \text{(Expression 22)}$$
$$\frac{1}{n}\{S1(1) - S1(2)) + (S1(3) + \cdots + (S1(n) - S(n+1))\}$$

Thus, even if the noise is mixed in a specific sampling value, the decrease NEave2 can be calculated while inhibiting the influence of the noise.

The present embodiment exerts a following effect (XI) in addition to the effects (VII) to (X) of the fifth example embodiment.

(XI) The decrease NEave2 of the rotation speed during one rotation of the crankshaft 5 is calculated as the average value of the decreases of the rotation speed during n rotations of the section A1. Thus, even if the noise is mixed in a specific sampling value of the rotation speed of the section A1, the decrease NEave2 can be calculated while inhibiting the influence of the noise.

Figure 18:
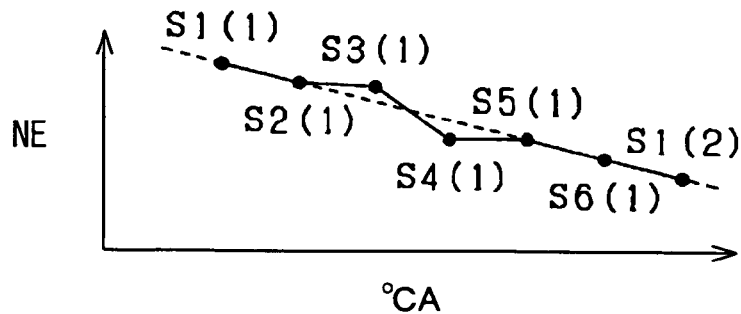
FIG. 18 is a graph showing rotation speed of a crankshaft according to a seventh example embodiment of the present invention.

Next, learning control according to a third example embodiment of the present invention will be described in reference to drawings. In the present embodiment, the attenuation degree (decrease NEave2) is calculated in a mode shown in FIG. 18 at step S114 of FIG. 14. The decrease NEave2 is calculated by averaging the decreases {S1($i$)-S1($i$+1)}, {S2($i$)-S2($i$+1)}, ..., {S6($i$)-S6($i$+1)}($i$=1 to n) of the rotation speeds of the sections A1-A6 through n rotations of the crankshaft 5 as shown by following Expression 23.

$$NEave2 = \frac{1}{6n}\{(S1(1) - S1(2)) + \quad \text{(Expression 23)}$$
$$\cdots (S1(n) - S1(n+1))\} +$$
$$\frac{1}{6n}\{(S2(1) - S2(2)) + \cdots +$$
$$(S2(n) - S2(n+1))\}$$
$$\vdots +$$
$$\frac{1}{6n}\{(S6(1) - S6(2)) + \cdots +$$
$$(S6(n) - S6(n+1))\}$$

Thus, even if the noise is mixed in a specific sampling value, the decrease NEave2 can be calculated while inhibiting the influence of the noise.

The present embodiment exerts a following effect (XII) in addition to the effects (VII) to (X) of the fifth example embodiment.

(XII) The decrease NEave2 of the rotation speed in one rotation of the crankshaft 5 is calculated as the average value of the decreases of the rotation speeds of the sections A1-A6 during the n rotations of the crankshaft 5. Thus, even if a noise is mixed in a specific sampling value of the rotation speed of any one of the sections A1-A6, the decrease NEave2 can be calculated while inhibiting the influence of the noise.

Figure 19:
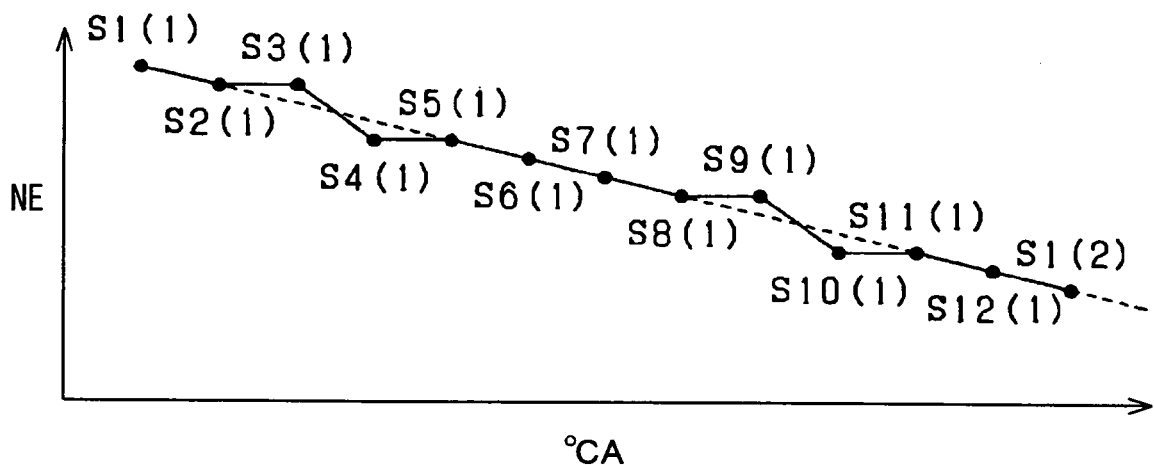
FIG. 19 is a graph showing rotation speed of a crankshaft according to an eighth example embodiment of the present invention.

Next, learning control according to an eighth example embodiment of the present invention will be described in reference to drawings. In the present embodiment, two rotations of the crankshaft 5 are used as the entire sections Aq (q=1 to 12), and the entire sections Aq are divided into sections Ai (i=1 to 6) and sections Ap (p=7 to 12). The section Ap is advanced from the corresponding section Ai by 360° CA (Ap=Ai+360° CA). In the setting of the sections Aq, the cam angle based on the output of the cam angle sensor 42 is used in addition to the crank angle based on the output of the crank angle sensor 40. As shown in FIG. 19 and following Expressions 24 and 25, average values NE1-NE12 of the rotation speeds S1-S12 of the respective sections A1-A12 and an entire section average value NEave of the average values NE1-NE12 are calculated, $$NE1 = \frac{1}{n}\{S1(1) + \cdots + S1(n)\},$$
$$\vdots$$
$$NE12 = \frac{1}{n}\{S12(1) + \cdots + S12(n)\}$$
(Expression 24)

$$NEave = \frac{1}{12}(NE1 + \cdots + NE12)$$
(Expression 25)

Then, a decrease NEave2 of the rotation speed of the specific section (here, the section A1) during the two rotations of the crankshaft 5 is calculated, and a decrease Wdh of the rotation speed per 90° CA is calculated by dividing the decrease NEave2 by eight as shown by following Expression 26.

$$Wdh = \frac{S1(1) - S1(2)}{8} = \frac{NEave2}{8}$$
(Expression 26)

In the present embodiment, the angle range of 720° CA is divided into four groups. The first group including the sections A1-A3 includes the compression top dead center of the first cylinder #1. The second group including the sections A4-A6 includes the compression top dead center of the third cylinder #3. The third group including the sections A7-A9 includes the compression top dead center of the fourth cylinder #4. The fourth group including the sections A10-A12 includes the compression top dead center of the second cylinder #2.

Reference values 1ave, 2ave, 3ave, 4ave of the rotation speeds of the first to fourth groups are calculated by using the entire section average value NEave and the decrease Wdh as shown by following Expression 27. The reference values 1ave, 2ave, 3ave, 4ave are reference values of the average values of the rotation speeds of the respective groups determined from the attenuation line.

1ave=NEave+3Wdh,

3ave=NEave+Wdh,

4ave=NEave−Wdh,

2ave=NEave−3Wdh, (Expression 27)

If the reference values 1ave-4ave are calculated, correction values of the respective sections A1-A12 for equalizing the angle ranges of the respective groups are calculated as in the fifth example embodiment.

Each one of the average values NE1-NE12 is an average value of n sampling values of the rotation speed of each one of the sections A1-A12. Therefore, the influence of the noise mixing in the output of the crank angle sensor 40 is sufficiently inhibited. The influence of the rotation fluctuation of the crankshaft 5 is included. However, the influence is sufficiently inhibited. The rotation fluctuation includes rotation fluctuation caused by a cyclic force applied to the crankshaft 5 in a four-stroke cycle, for example. As for the cyclic force, forces at different phases are not reflected in the respective average values NE1-NE12 in an averaged manner. The average values NE1-NE12 reflect only the influence of the component of the cyclic force at specific phases. Here, the phases deviated from each other by an integral multiple of 720° CA are defined as the same phases. By calculating the correction value based on the deviation between the average value of each one the sections A1-A12 and one of the reference values 1ave, 2ave, 3ave, 4ave, the correction value can be calculated more suitably for each one of the sections A1-A12.

The present embodiment exerts following effects (XIII) and (XIV) in addition to the effects (VII) to (X) of the fifth example embodiment.

(XIII) Two rotations of the crankshaft 5 are used as the entire sections, and the correction values are calculated for the sections A1-A12 respectively. Thus, the influence of the cyclic force applied to the crankshaft 5 in the four-stroke cycle is eliminated more suitably when the correction values are calculated.

(XIV) The attenuation degree of the rotation speed of the crankshaft 5 is calculated by using the decrease NEave2 of the rotation speed of the specific section (here, section A1) in the two rotations of the crankshaft 5. Thus, the influence of the cyclic force applied to the crankshaft 5 in the four-stroke cycle is eliminated more suitably when the attenuation degree is calculated.

Next, learning control according to a ninth example embodiment of the present invention will be described in reference to drawings. In the present embodiment, the grouping is not performed. The attenuation line, with which the rotation speed decreases in proportion to the increase of the rotation angle, is used as the reference. The correction values for the sections A1-A6 are calculated based on deviations between the attenuation line and the rotation speeds of the respective sections A1-A6.

Figure 20:
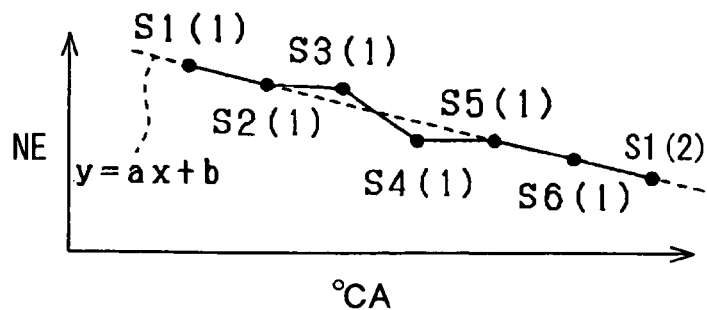
FIG. 20 is a graph showing rotation speed of a crankshaft according to a ninth example embodiment of the present invention.

The decrease NEave2 is calculated like the processing at Step S114 of FIG. 14 (NEave2=S1(1)−S1(2)). A value provided by dividing the decrease NEave2 by 360 is the inclination "a" of the attenuation line shown in FIG. 20 as shown by following Expression 28.

$$a = \frac{NEave2}{360} \quad \text{(Expression 28)}$$

Here, the sampling point of the rotation speed S1(1) is set at 0° CA. The intercept "b" of the attenuation line (y=a x+b) can be calculated as shown by following Expression 29 on an assumption that the rotation speed coincides with the entire section average value NEave when the variable "x" is 180° CA.

$$NEave = a \times \frac{360}{2} + b \quad \text{(Expression 29)}$$

If the attenuation line is thus obtained, the correction values K1-K6 of the sections A1-A6 are calculated as shown by following Expression 30.

$$K1 = \frac{1}{n}\left(\frac{S1(1)}{a \times 0 + b} + \ldots + \frac{S1(n)}{a \times 360 \times (n-1) + b}\right), : \quad \text{(Expression 30)}$$

$$K6 = \frac{1}{n}\left(\frac{S6(1)}{a \times 300 + b} + \ldots + \frac{S6(n)}{a \times (300 + 360 \times (n-1)) + b}\right)$$

For example, the correction value K1 is calculated as an average value of ratios of n sampled rotation speeds S1(i) (i=1 to n) to the rotation speeds (a×(360(i−1)+b).

The present embodiment exerts a following effect (XV) in addition to the effects (VII), (VIII) of the fifth example embodiment.

(XV) The angle errors of the sections A1-A6 are sensed as the correction values K1-K6 based on the deviation of the rotation speed of an arbitrary section from the attenuation line, with which the rotation speed decreases in proportion to the increase of the rotation angle. Thus, the angle errors of the sections A1-A6 can be calculated easily and suitably.

The section used to calculate the decrease NEave2 is not limited to the section A1 in the fifth, eighth or ninth example embodiment. An arbitrary section out of the sections A1-A6 may be used to calculate the decrease NEave2. Moreover, the section used to calculate the decrease NEave2 is not limited to the sections A1-A6. For example, a section defined by either one of the two teeth 22 defining the section A2 and the tooth 22 within the section A2 may be used.

As the method for calculating the decrease NEave2 in the eighth or ninth example embodiment, the method of the sixth or seventh example embodiment may be used.

The method for grouping the crank angle range is not limited to the method described in the fifth to eighth example embodiments. The groups may be arbitrarily set such that each one of the groups includes the rotation angle corresponding to the compression top dead center of each cylinder in accordance with the number of the cylinders. For example, in the case of a five-cylinder internal combustion engine, a range from 0° CA to 144° CA may constitute a first group, a range from 144° CA to 288° CA may constitute a second group, a range from 288° CA to 432° CA may constitute a third group, a range from 432° CA to 576° CA may constitute a fourth group and a range from 576° CA to 720° CA may constitute a fifth group. In this case, the teeth 22 should preferably define the boundaries of the respective groups.

The method for equalizing the angle ranges of the respective groups based on the reference values of the rotation speeds of the groups is not limited to the method described in the above embodiments. For example, the correction values of the respective sections may be set such that the average values of the rotation speeds of the sections of each group decrease monotonically and an average value of the average values coincides with the reference value.

In the ninth example embodiment, the entire sections may be the same as those of the eighth example embodiment. Thus, the influence of the cyclic force applied to the crankshaft 5 in the four-stroke cycle is eliminated more suitably when the correction values are calculated.

The attenuation line is not limited to the line, with which the rotation speed of the crankshaft 5 decreases in proportion to the increase of the rotation angle. For example, the attenuation line may be set such that the time necessary for the rotation of the section increases in proportion to the increase of the rotation angle. The attenuation line may be set such that the rotation speed decreases in proportion to the time.

The intercept information of the attenuation line is not limited to the information calculated with the entire section average value. For example, in the ninth example embodiment, the attenuation line may be calculated based on the rotation speed S3(1) of the section A3 and the decrease NEave2 calculated by using the section A3. In this case, the attenuation line is offset from the actual attenuation line. However, by correcting the angle errors of the sections A1-A6, the angle ranges of the respective groups can be set equal at high accuracy.

The correction values of the sections A1-A6 are not limited to the values set based on the ratios of the average values NE1-NE6 of the rotation speeds of the respective sections to the reference values HDave, BKave, etc. The correction values may be set based on the differences between the average values NE1-NE6 and the reference values.

In the above example embodiments, the angle error is sensed by using the rotation speed of the section. Alternatively, the angle error may be sensed by using the time necessary for the rotation of the section. Alternatively, the angle error may be sensed based on a parameter correlated with the time necessary for the rotation of the section or the rotation speed. Thus, a physical quantity of the time necessary for the rotation of the section or a value equivalent to the time may be used.

The method for using the correction value is not limited to the learning of the learning value for correcting the variation in the fuel injection characteristics. For example, in certain control for starting the fuel injection at predetermined crank angle, time since a certain tooth 32 is sensed until a predetermined crank angle occurs is calculated, and the fuel injection is started when the time elapses. In such a case, accurate calculation of the rotation speeds of the respective sections is important to improve the control accuracy of the injection start timing. For example, it is effective to set the injection start timing by using the correction values calculated in the ninth example embodiment.

The internal combustion engine is not limited to the engine in which the intake valve and the exhaust valve open and close in conjunction with the rotation of the cam driven by the engine. For example, the intake valve or the exhaust valve may be structured as an electromagnetic valve. In this case, if the intake valves or the exhaust valves of all the cylinders are fully opened during the fuel cutting control, the force applied from the pistons 3 of the respective cylinders to the crankshaft 5 through the connecting rods 4 or the fluctuation of the force can be minimized.

The vehicle is not limited to the manual transmission vehicle but may be an automatic transmission vehicle. In this case, the learning control may be performed during fuel cutting control when the vehicle is decelerating.

The internal combustion engine is not limited to the diesel engine, but may be a gasoline engine.

The structure or the number of the sensed portions (teeth 22) rotating in synchronization with the rotation of the crankshaft 5 or the sensed portions (teeth 32) rotating in synchronization with the rotation of the camshaft 6 may be changed arbitrarily.

The present invention should not be limited to the disclosed embodiments, but may be implemented in many other ways without departing from the spirit of the invention.

What is claimed is:

1. A rotation angle sensing device that reads in an output of a crank angle sensor for sensing multiple sensed portions rotating in synchronization with rotation of a crankshaft of an internal combustion engine to sense a rotation angle of the crankshaft, the rotation angle sensing device comprising:
   a fuel cutting control device that performs fuel cutting control for stopping fuel injection generating torque of the crankshaft;
   a calculation device that divides entire sections defined by one or more rotations of the crankshaft into multiple sections by using the sensed portions and that calculates time necessary for rotation of each one of the multiple sections based on the output of the crank angle sensor obtained during the fuel cutting control;
   an averaging device that calculates an average value of multiple calculation values of the calculation device for each section; and
   an error sensing device that senses an angle error of an arbitrary section out of the multiple sections based on comparison between the average value of the arbitrary section and the average value of another section or comparison between the average value of the arbitrary section and an average value of the average values of two or more sections out of the multiple sections.

2. The rotation angle sensing device as in claim 1, further comprising:
   an entire section averaging device that calculates an entire section average value by averaging the average values of the multiple sections, wherein
   the error sensing device compares the average value of the arbitrary section with the entire section average value to sense the angle error of the arbitrary section.

3. The rotation angle sensing device as in claim 1, further comprising:
   a storage device that stores a reference model for determining a reference of a deviation between the average value of the arbitrary section and the average value of another section or a deviation between the average value of the arbitrary section and the average value of the average values of the two or more sections, wherein
   the error sensing device eliminates the deviation determined by the reference model from the deviation between the average value of the arbitrary section and the average value of another section or the deviation between the average value of the arbitrary section and the average value of the average values of the two or more sections when the error sensing device senses the error.

4. The rotation angle sensing device as in claim 3, wherein
   the engine is a four-stroke engine and has a camshaft mechanically linked with the crankshaft, and
   the deviation determined by the reference model contains a deviation caused by a cyclic force applied to the crankshaft in a four-stroke cycle.

5. The rotation angle sensing device as in claim 3, wherein
   the reference model is defined by the average values of the sections provided in the case where there is no structural error in intervals among the sensed portions.

6. The rotation angle sensing device as in claim 1, wherein
   the entire sections correspond to one rotation of the crankshaft.

7. The rotation angle sensing device as in claim 1, wherein
   the engine is a four-stroke engine and has a camshaft mechanically linked with the crankshaft, and
   the entire sections correspond to two rotations of the crankshaft.

8. The rotation angle sensing device as in claim 1, further comprising:
   a taking device that takes in a sensing value of a cam angle sensor for sensing multiple cam sensed portions rotating in synchronization with rotation of a camshaft mechanically linked with the crankshaft;
   a cam sensing device that divides entire cam sections corresponding to two rotations of the crankshaft into multiple cam sections by using the multiple cam sensed portions and senses an angle error of an arbitrary cam section out of the multiple cam sections based on comparison between an average value of multiple calculation values of time necessary for rotation of the arbitrary cam section and an average value of calculation values of time necessary for rotation of another cam section or comparison between the average value of the arbitrary cam section and an average value of the average values of two or more cam sections, the calculation values calculated during the fuel cutting control; and
   an error correcting device that corrects the sensing result of the error sensing device based on the sensing result of the cam sensing device.

9. A rotation angle sensing device that senses an angle error of an arbitrary section out of sections determined by multiple sensed portions rotating in synchronization with rotation of a crankshaft of an internal combustion engine by calculating a section parameter corresponding to a physical value of time necessary for rotation of the arbitrary section or a value equivalent to the time based on an output of a crank angle sensor sensing the arbitrary section when fuel cutting control for stopping fuel injection generating torque of the crankshaft is performed, the rotation angle sensing device comprising:
   an estimating device that estimates an attenuation degree of rotation speed of the crankshaft due to the fuel cutting control based on calculation values of the physical value related to rotation of a certain section defined by two predetermined sensed portions at a start and an end of an integral multiple of one rotation of the crankshaft; and
   an error sensing device that determines a reference value of the physical value of the arbitrary section based on an attenuation mode of the rotation speed determined based on the physical value related to the rotation of the section determined by the sensed portions and the attenuation degree and that senses the angle error of the arbitrary section based on a deviation of the section parameter of the arbitrary section from the reference value.

10. The rotation angle sensing device as in claim 9, wherein
the section parameter is calculated as an average value of multiple values of the physical value related to the rotation of the arbitrary section.

11. The rotation angle sensing device as in claim 9, further comprising:
a calculating device that calculates the section parameters of multiple sections provided by dividing entire sections with the sensed portions, the entire sections defined by an integral multiple of one rotation of the crankshaft, wherein
the error sensing device uses each one of the multiple sections as the arbitrary section when sensing the angle error of the section.

12. The rotation angle sensing device as in claim 11, further comprising:
an entire section averaging device that calculates an average value of the section parameters of the entire sections as an entire section average value, wherein
the error sensing device determines the reference value based on the attenuation mode of the rotation speed determined based on the entire section average value and the attenuation degree.

13. The rotation angle sensing device as in claim 11, wherein
the engine is a multi-cylinder engine,
the multiple sections are grouped by angle ranges divided by an equal angle such that each angle range includes a rotation angle of the crankshaft corresponding to a compression top dead center of each cylinder of the engine, and
the error sensing device has a first device that calculates a reference value of the average value of the physical values in the angle range of each one of the groups based on the attenuation mode and a second device that senses the angle error of each section based on the reference value of each group in standardization for equalizing the angle ranges of the groups.

14. The rotation angle sensing device as in claim 13, wherein
the attenuation mode is defined by an attenuation line, with which the physical value changes in proportion to a change of the rotation angle.

15. The rotation angle sensing device as in claim 9, wherein
the attenuation mode is defined by an attenuation line, with which the physical value changes in proportion to a change of a rotation angle of the crankshaft, and
the error sensing device senses the angle error of the arbitrary section based on a deviation of the section parameter of the arbitrary section from the attenuation line.

* * * * *